(12) United States Patent
Nuzzi et al.

(10) Patent No.: US 10,726,411 B2
(45) Date of Patent: Jul. 28, 2020

(54) LOCATION-BASED PAYER CHARGING SYSTEM

(71) Applicant: PAYPAL, INC., San Jose, CA (US)

(72) Inventors: Frank Anthony Nuzzi, Pflugerville, TX (US); Farah Naz Amin, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 775 days.

(21) Appl. No.: 14/928,564

(22) Filed: Oct. 30, 2015

(65) Prior Publication Data

US 2016/0055475 A1 Feb. 25, 2016

Related U.S. Application Data

(63) Continuation of application No. 13/191,166, filed on Jul. 26, 2011, now Pat. No. 9,183,551.

(51) Int. Cl.
| | | |
|---|---|---|
| *G06Q 20/32* | (2012.01) | |
| *G06Q 20/04* | (2012.01) | |
| *G06Q 20/14* | (2012.01) | |
| *G06Q 20/10* | (2012.01) | |
| *G06Q 50/00* | (2012.01) | |

(52) U.S. Cl.
CPC ..... *G06Q 20/3224* (2013.01); *G06Q 20/0457* (2013.01); *G06Q 20/102* (2013.01); *G06Q 20/145* (2013.01)

(58) Field of Classification Search
None
See application file for complete search history.

(56) References Cited

U.S. PATENT DOCUMENTS

| | | | |
|---|---|---|---|
| 8,225,997 B1 * | 7/2012 | Bierbaum | G06Q 20/0453 235/375 |
| 8,498,900 B1 * | 7/2013 | Spirin | G06Q 50/00 340/286.09 |
| 2001/0025251 A1 | 9/2001 | Konishi et al. | |
| 2002/0049630 A1 | 4/2002 | Furuta et al. | |
| 2003/0020634 A1 | 1/2003 | Banerjee et al. | |
| 2003/0040944 A1 | 2/2003 | Hileman | |
| 2003/0189498 A1 | 10/2003 | Kakihara et al. | |
| 2006/0065733 A1 | 3/2006 | Lee et al. | |
| 2007/0225911 A1 | 9/2007 | Chanick | |
| 2008/0189145 A1 | 8/2008 | Wurster | |
| 2008/0201212 A1 | 8/2008 | Hammad et al. | |
| 2008/0201274 A1 | 8/2008 | Podgurny et al. | |
| 2008/0208681 A1 | 8/2008 | Hammad et al. | |
| 2009/0319306 A1 * | 12/2009 | Chanick | G01C 21/3679 705/5 |
| 2010/0076878 A1 | 3/2010 | Burr et al. | |
| 2010/0080163 A1 | 4/2010 | Krishnamoorthi et al. | |

(Continued)

*Primary Examiner* — Garcia Ade
(74) *Attorney, Agent, or Firm* — Haynes and Boone, LLP

(57) ABSTRACT

A method for charging a payer includes detecting a payer device, which is associated with a payer account, entering an event area. The payer device is then associated with an event invoice in a database. When the payer device is determined to have been involved in at least one payer charging event while being located in the event area, a charge is associated with the event invoice in the database for each payer charging event the payer device has been involved in. When the payer device is detected leaving the event area, a payment is charged to the payer account for the event invoice.

20 Claims, 19 Drawing Sheets

(56) References Cited

U.S. PATENT DOCUMENTS

2010/0250292 A1    9/2010   Wurster
2011/0029370 A1    2/2011   Roeding et al.
2012/0278137 A1   11/2012   Dixon et al.

* cited by examiner

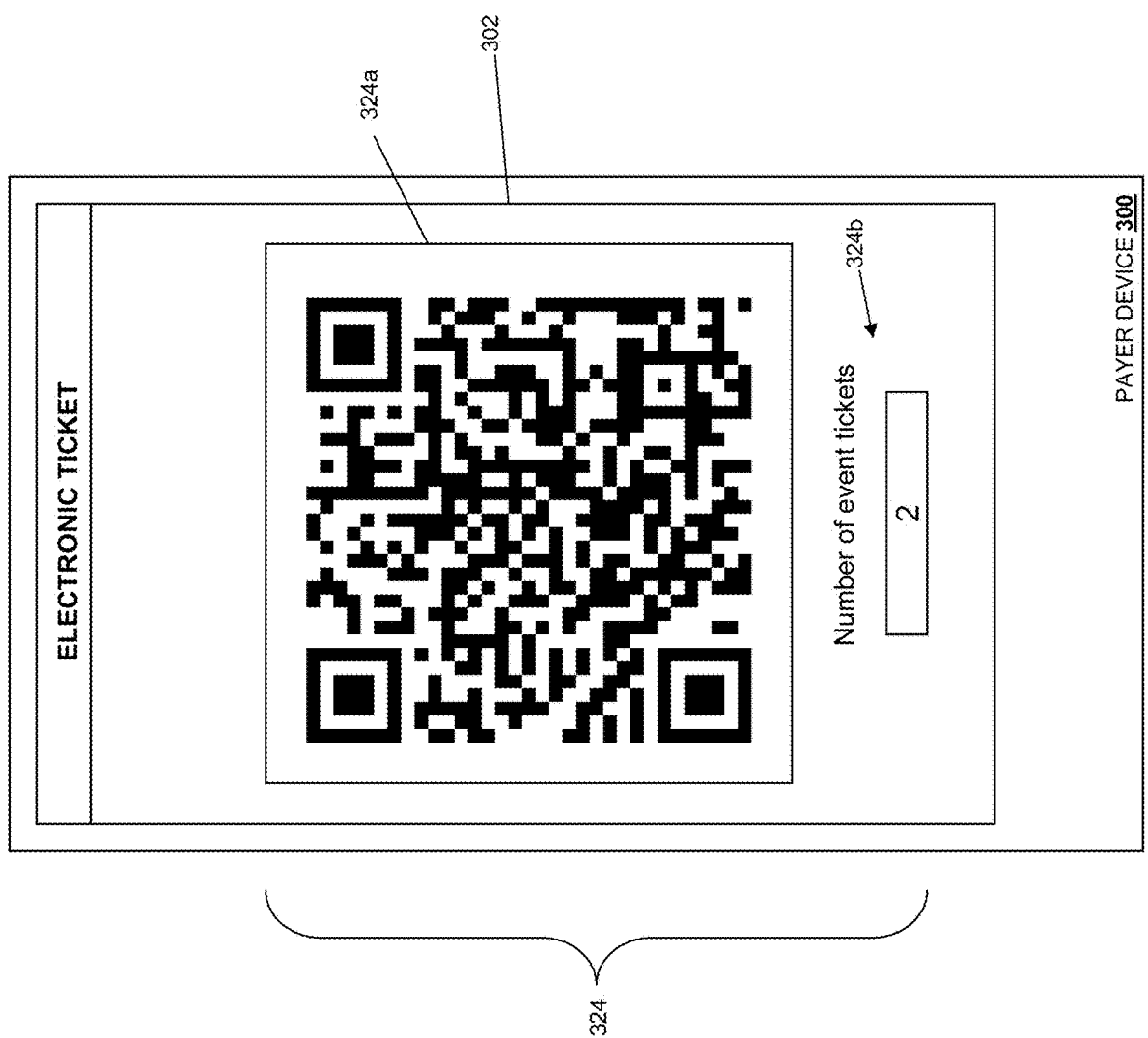

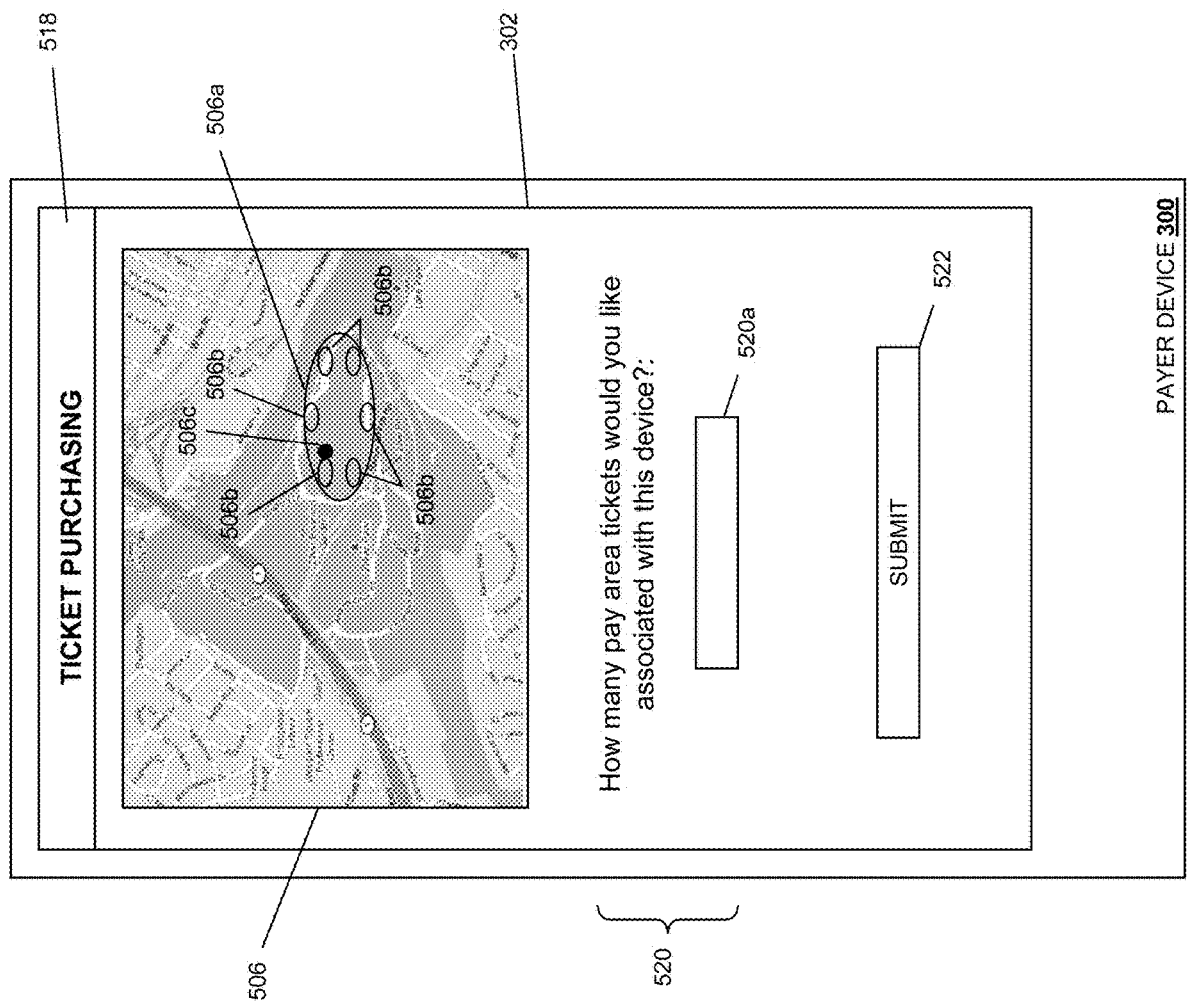

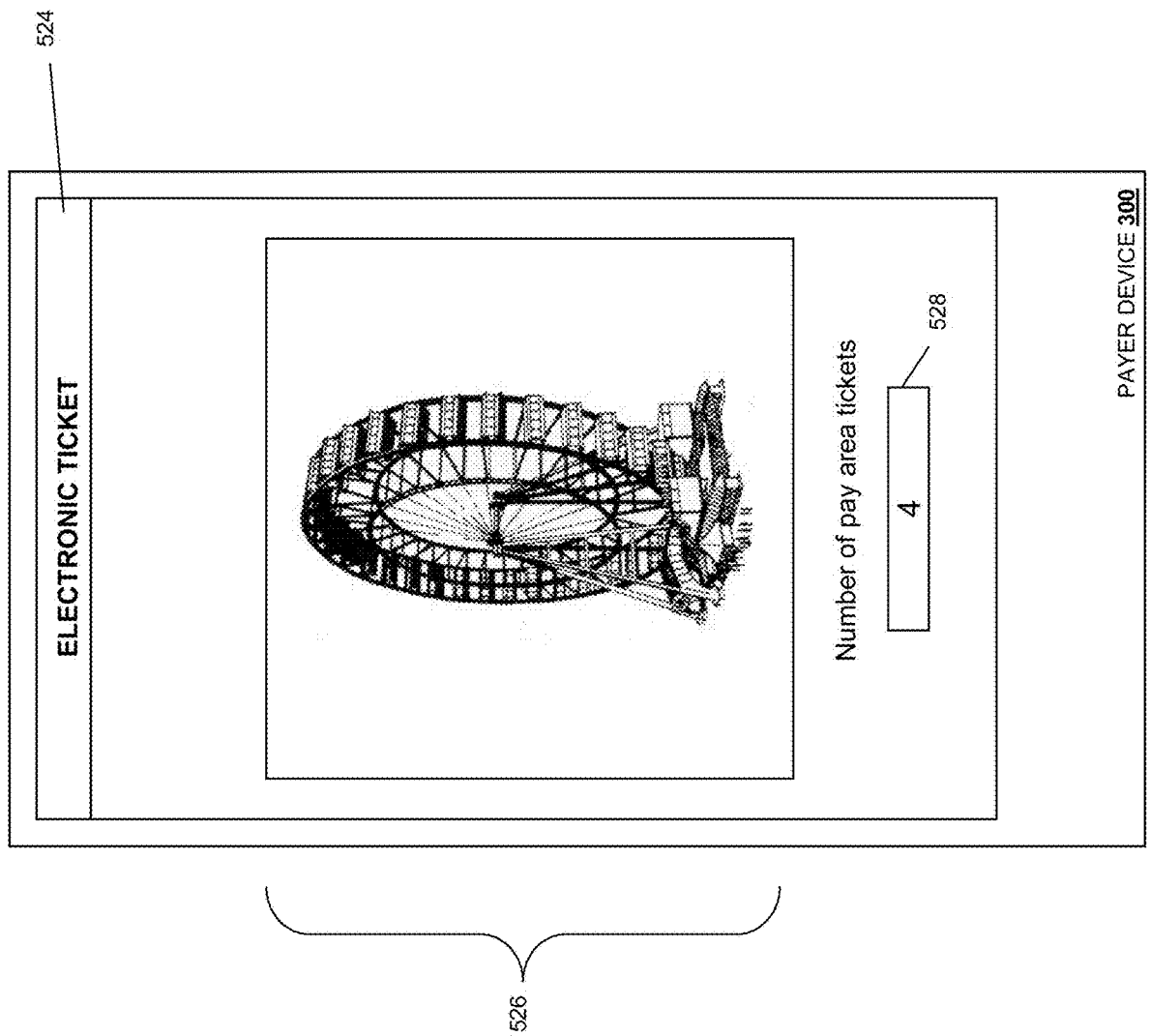

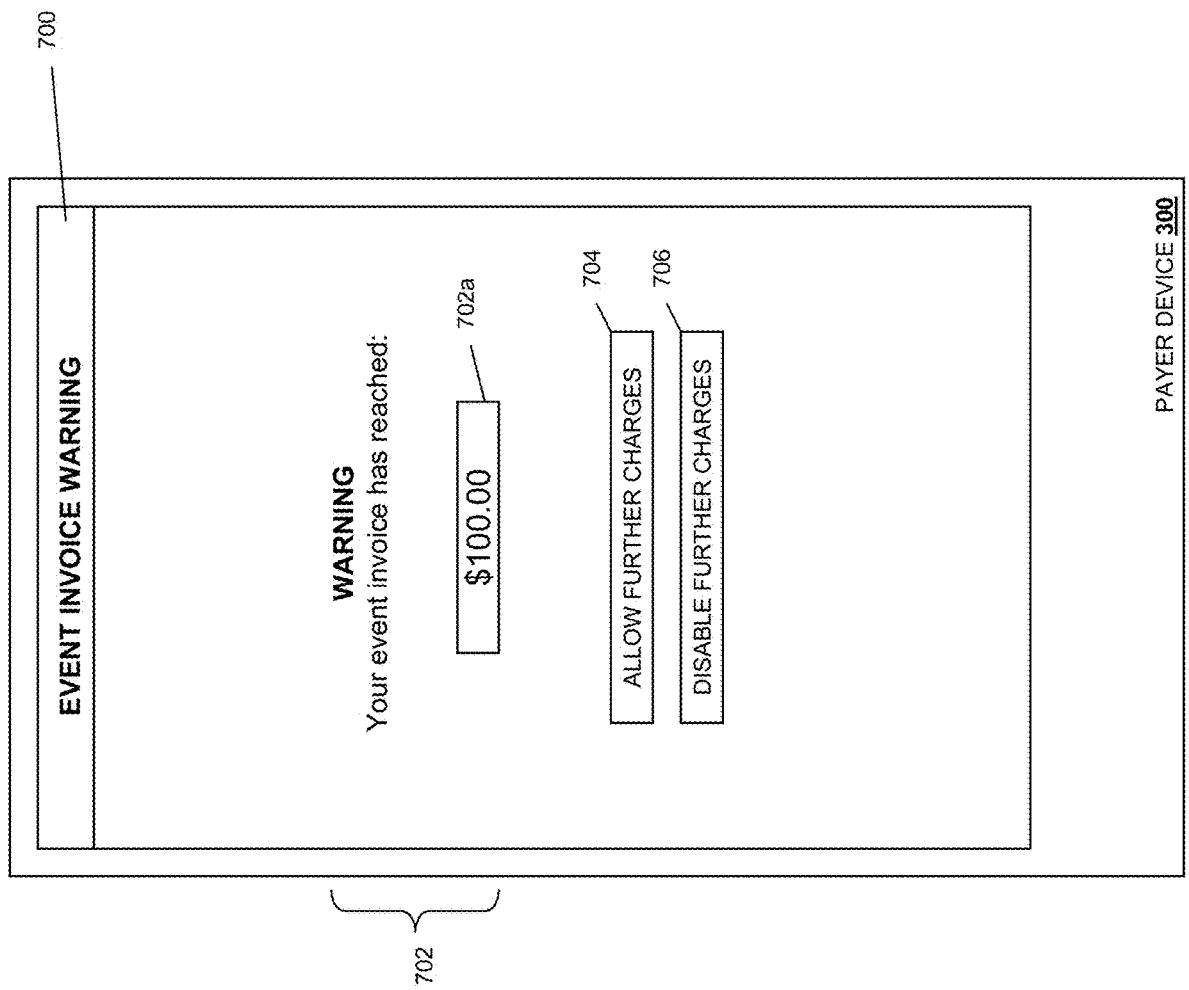

LOCATION-BASED PAYER CHARGING SYSTEM

CROSS REFERENCE TO RELATED APPLICATION

The present application is a continuation of U.S. patent application Ser. No. 13/191,166, filed Jul. 26, 2011, entitled "Location-Based Payer Charging System". The present application is related to U.S. patent application Ser. No. 13/492,402, filed Jun. 8, 2012, entitled "Location-Based Payer Charging System", which is a continuation-in-part of U.S. patent application Ser. No. 13/191,166, the disclosures of which are incorporated herein by reference.

BACKGROUND

Field of the Invention

The present invention generally relates to online and/or mobile payments and more particularly to a location-based payer charging system.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an online or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why online and mobile purchases are growing very quickly.

One limitation to online or mobile purchasing involves a payer attending an event such as, for example, an amusement park, a fair, carnival, a music festival, a sightseeing area, and/or a variety of other events known in the art. Conventionally, the use of online or mobile payments with regard to events is limited to buying a ticket for the event online or with a mobile device prior to the event and then providing that ticket at the event in order to enter the event. Such conventional uses fail to take advantage of the benefits provided by mobile devices that could allow a wide variety of different event charging schemes. Furthermore, event providers may wish to charge the payer based on the areas of the event visited and/or activities participated in during the event. Such charges typically must be paid for using cash, as the conventional methods of using of a mobile device to repeatedly make payments within the event is undesirable for both the event provider and the payer.

Thus, there is a need for an improved payer charging system.

SUMMARY

According to one embodiment, a method for charging a payer includes detecting a payer device entering an event area and, in response, associating the payer device with an event invoice. Each time it is determined that the payer device is involved in a payer charging event while located in the event area, a charge is associated with the event invoice. When the payer device is detected leaving the event area, the event invoice is charged to a payer account that is associated with the payer device.

As a result, a payee may create an event area that allows payers to be charged based on their presence in the event area through the detection of the location of their payer devices. For example, the payer may be charged based on an amount of time located in the event area, based on their location in specific pay areas within the event area, and/or according to a variety of other location based charging schemes. Electronic tickets may be provided to the payer device to allow entry to the event area or pay areas within the event area.

These and other features and advantages of the present disclosure will be more readily apparent from the detailed description of the embodiments set forth below taken in conjunction with the accompanying figures.

BRIEF DESCRIPTION OF THE FIGURES

FIG. 2b is a map view illustrating an embodiment of the event area of FIG. 2a;

FIG. 3c is a front view illustrating an embodiment of a payer device displaying an electronic ticket;

FIG. 5b is a map view illustrating an embodiment of the event area of FIG. 5a;

FIG. 5d is a front view illustrating an embodiment of a payer device displaying a ticket purchasing screen in response to choosing to enter a pay area;

FIG. 5e is a front view illustrating an embodiment of a payer device displaying an electronic ticket;

FIG. 7 is a front view illustrating an embodiment of a payer device displaying a warning screen in response to detecting a predetermined event invoice amount;

Figure 1:
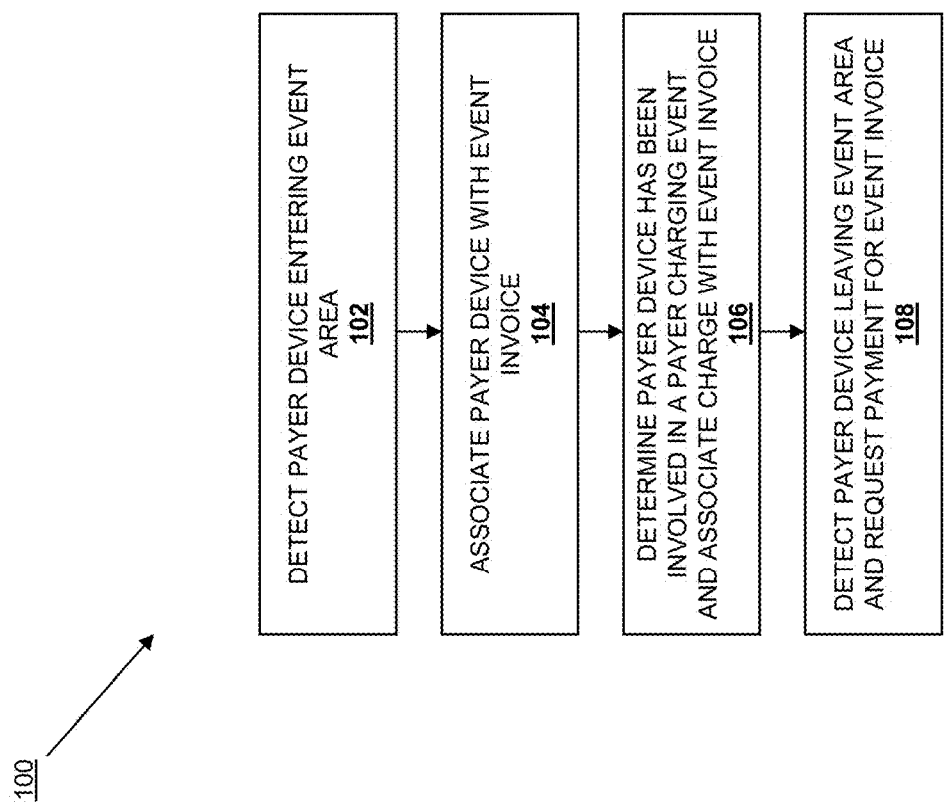
FIG. 1 is a flow chart illustrating an embodiment of a method for charging a payer.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for charging a payer based on the location of the payer at an event such as, for example, a fair, a carnival, an amusement park, a music festival, a sight seeing area (e.g., a national park), a sporting event, and/or a variety of other events known in the art. The payer includes a payer device that is associated with a payer account. The payer account may be provided by a payee/event provider that is providing the event, an account provider (e.g., a credit account provider, a checking account provider, a savings account provider, and/or a variety of other account providers known in the art), and/or a payment service provider that provides payment services for the event (e.g., PayPal Inc. of San Jose, Calif.) by, for example, providing a payer account for the payer, a payee account for the payee, and/or transferring payments from a payer account (e.g., provided by the account provider) to a payee account (e.g., provided by the account provider). A payer device detection system is operable to detect payer devices entering or attempting to enter and leaving or attempting to leave the area of the event. Upon detecting a payer device entering the event, the payer device is associated with an event invoice, and when the payer device is involved in a payer charging event while being located in the event area, a charge is associated with the event invoice. Upon detecting the payer device leaving or attempting to leave the event area, the payer account is charged for the event invoice.

Figure 2A:
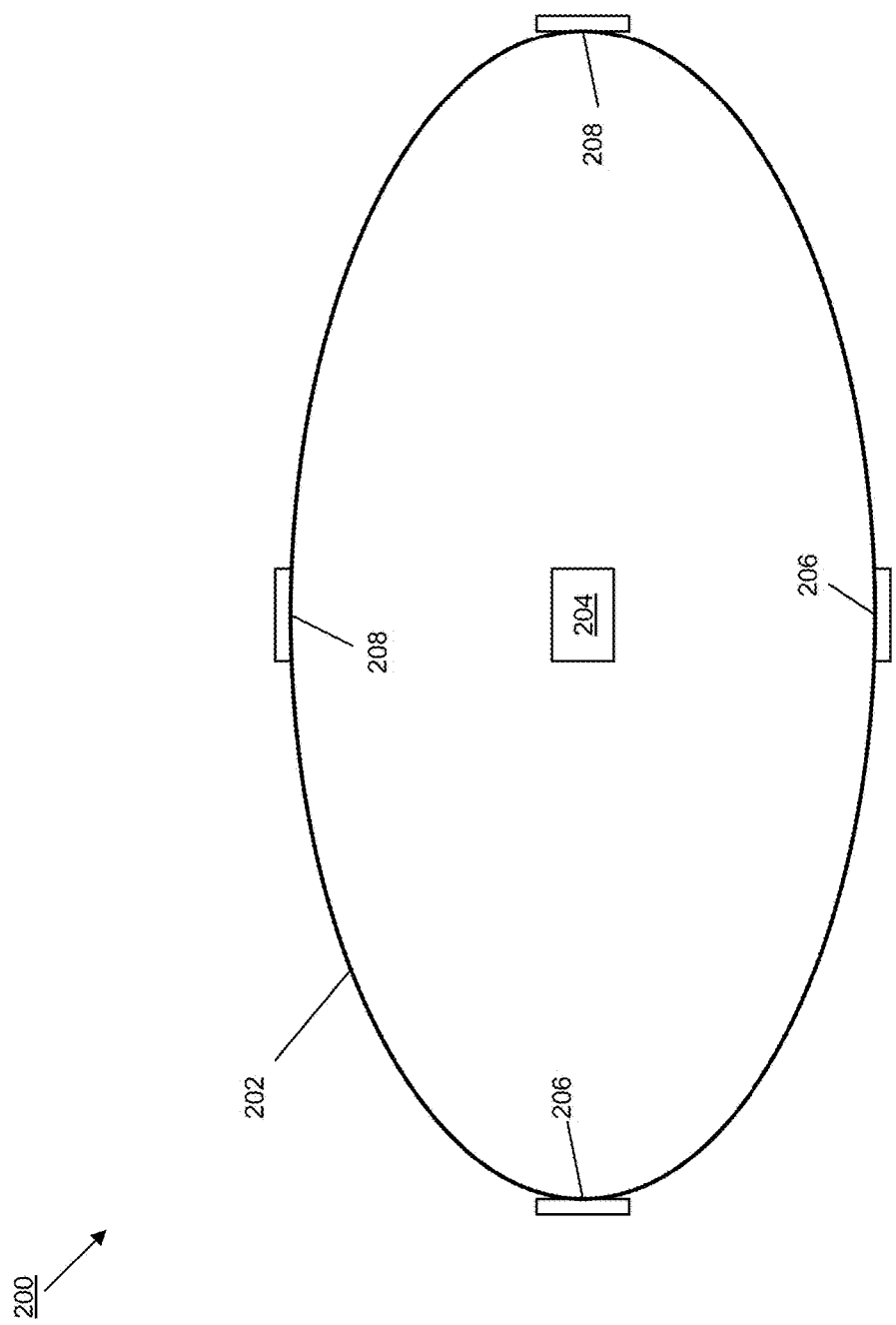
FIG. 2a is a schematic view illustrating an embodiment of an event area.
Figure 2B:
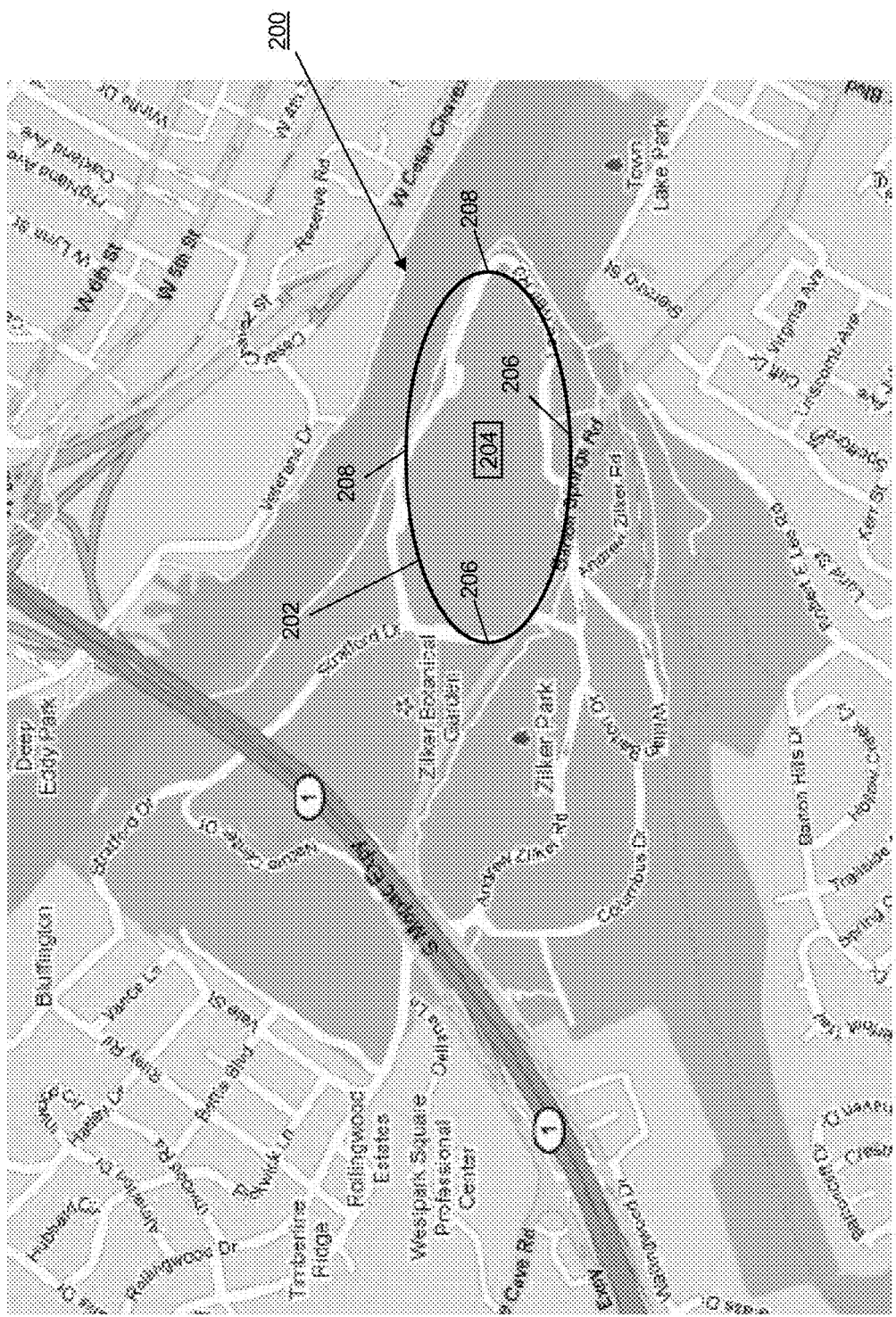

Referring now to FIGS. 1, 2a, and 2b, a method 100 for charging a payer is illustrated. The method 100 begins at block 102 where a payer device is detected entering or attempting to enter an event area. FIG. 2a illustrates an embodiment of a location based payer charging system 200 that may include an event area that is bounded by a perimeter 202, a networking system 204, and/or a plurality of event area entrances 206 and exits 208. In an embodiment, the payee/event provider may define the event area using a plurality of positioning coordinates. For example, FIG. 2b illustrates how the event area may be defined by the perimeter 202 that includes a plurality of Global Positioning System (GPS) coordinates on a map. One of skill in the art will recognize that a variety of different sized and shaped boundaries (e.g., the oval shaped boundary provided by the perimeter 202 of the event area in the illustrated embodiment) may be created to define one or more event areas while remaining within the scope of the present disclosure. In an embodiment, the location based payer charging system 200 may be operated by the payee/event provider, the payment service provider, a location based payer charging system provider, and/or a variety of other entities known in the art. Thus, in an embodiment, the payee/event provider may provide the positioning coordinates for the event area to the entity operating the location based payer charging system 200.

The event area may be provided for an event that requires a payer to pay in order to enter any portion of the event area. In one embodiment, the perimeter 202 of the event area may coincide or be positioned adjacent to fencing or other obstructions that are used to prevent entrance to the event area, while the event area entrances 206 may provide the only entrances to the event area and the event area exits 208 may provide the only exits from the event area 200. Thus, GPS coordinates may be provided to coincide with the event area entrances 206 and the event area exits 208 such that they are operable to be used to detect payer devices entering the event area through the event area entrances 206 and leaving the event area through the event area exits 208. Alternatively or in combination, GPS coordinates may also be provided to coincide with the event area such that they are operable to be used to detect payer devices located anywhere near or within the perimeter 202 of the event area.

In another embodiment, event area entrances and exits may coincide with each other. In such a case, the system may be determine an entry when a payer device first detected near an entrance/exit and an exit may be determined when the payer device is next detected near an entrance/exit. Alternatively, entry may be determined when the payer device is detected within the perimeter 202 and exit may be determined when the payer device is detected outside the perimeter 202.

In another embodiment, the event area may be provided for an event that does not require a payer to pay in order to enter the event area, or instead asks for voluntary donations to enter the event area. As such, the perimeter 202 of the event area may be unobstructed, and GPS coordinates may be provided to define the perimeter 202 such that they are operable to be used to detect payer devices entering and exiting the event area across any portion of the perimeter 202. Alternatively, GPS coordinates may also be provided to coincide with the event area such that they are operable to be used to detect payer devices located anywhere near or within the perimeter 202 of the event area.

In an embodiment, the networking system 204 may include one or more devices to provide a network that covers the event area and, in one embodiment, a limited area that extends outside the perimeter 202 of the event area. For example, the networking system 204 may provide a network such as, for example, a Local Area Network (LAN), that extends throughout the event area and approximately 5-10 feet beyond the perimeter 202 of the event area.

At block 102, a payer including a payer device approaches the perimeter 202 of the event area 200 and is detected by the location based payer charging system 200 as entering or attempting to enter the event area. In an embodiment, the payer device may include an application that allows the payer device to be used in the location based payer charging system 200. For example, the user of the payer device may have added the application to the payer device to attend the event and be charged using the location based payer charging system 200. In such an embodiment, the application may be updated with the GPS coordinates provided by the payee/event provider to define the event area, and the application monitors the location of the payer device (e.g., using a GPS device in the payer device) to determine whether the payer device is within a predetermined distance of the event area. Once within the predetermined distance of the event area, the application communicates with the location based payer charging system 200 (e.g., over a network such as the Internet) such that the payer device is detected as entering or attempting to enter the event area by the location based charging system 200.

In another embodiment, the payer device may detect the LAN provided by the networking system 204 and be prompted to connect to the LAN such that the payer device is detected by the location based payer charging system 200 as entering or attempting to enter the event area. Connection of the payer device to the LAN may cause the location based payer charging system 200 to cause the payer device to connect to the location based payer charging system 200 through another communications link such as, for example, a cellular communications link that provides an Internet connection. While a few examples of systems and methods to detect the payer device have been provided, one of skill in the art will recognize that these should not be viewed as limiting, and a variety of other systems and methods to detect that the payer device is entering or attempting to enter the event area will fall within the scope of the present disclosure.

Figure 3A:
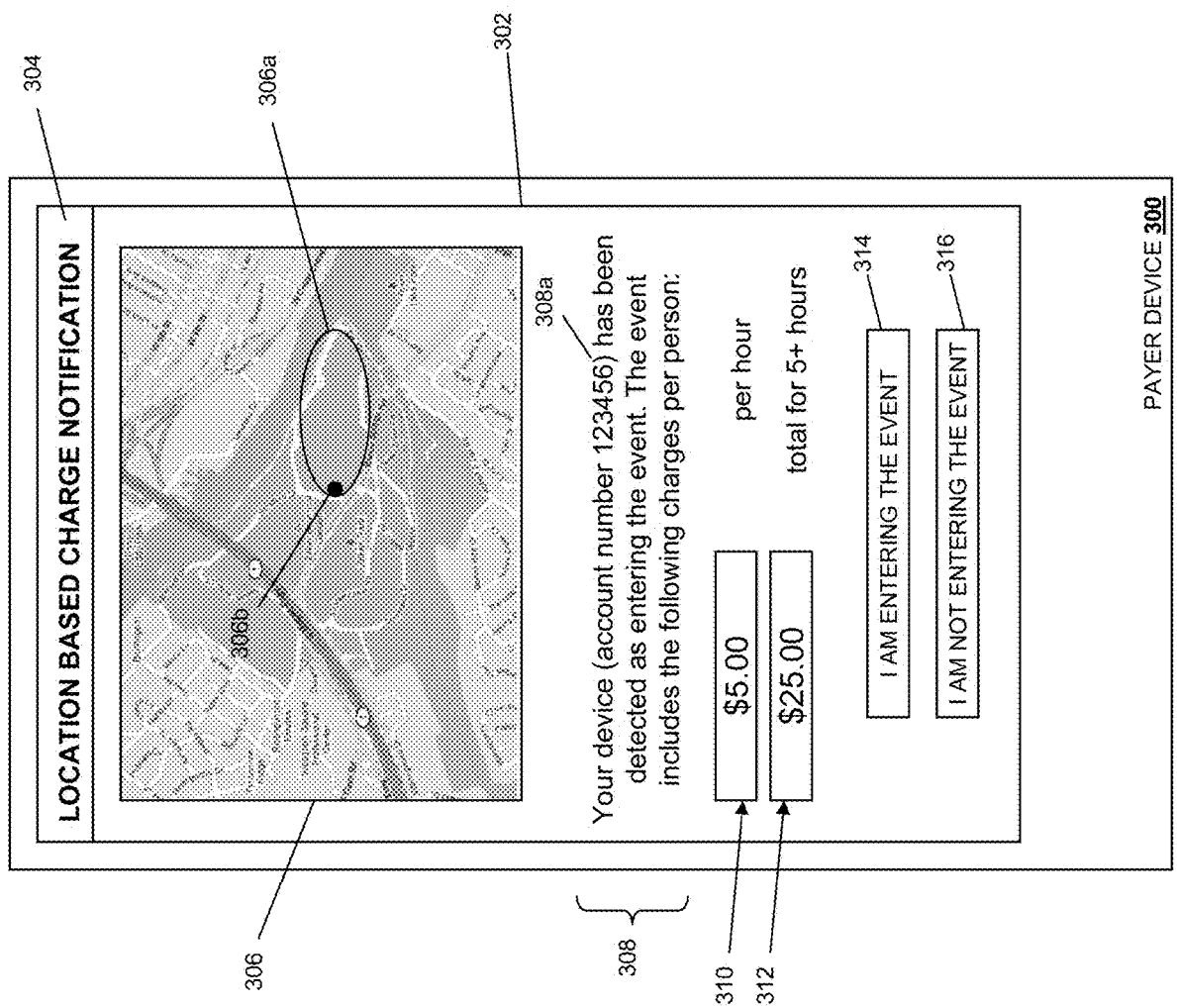
FIG. 3a is a front view illustrating an embodiment of a payer device displaying a notification in response to being detected entering or attempting to enter an event area.
Figure 3B:
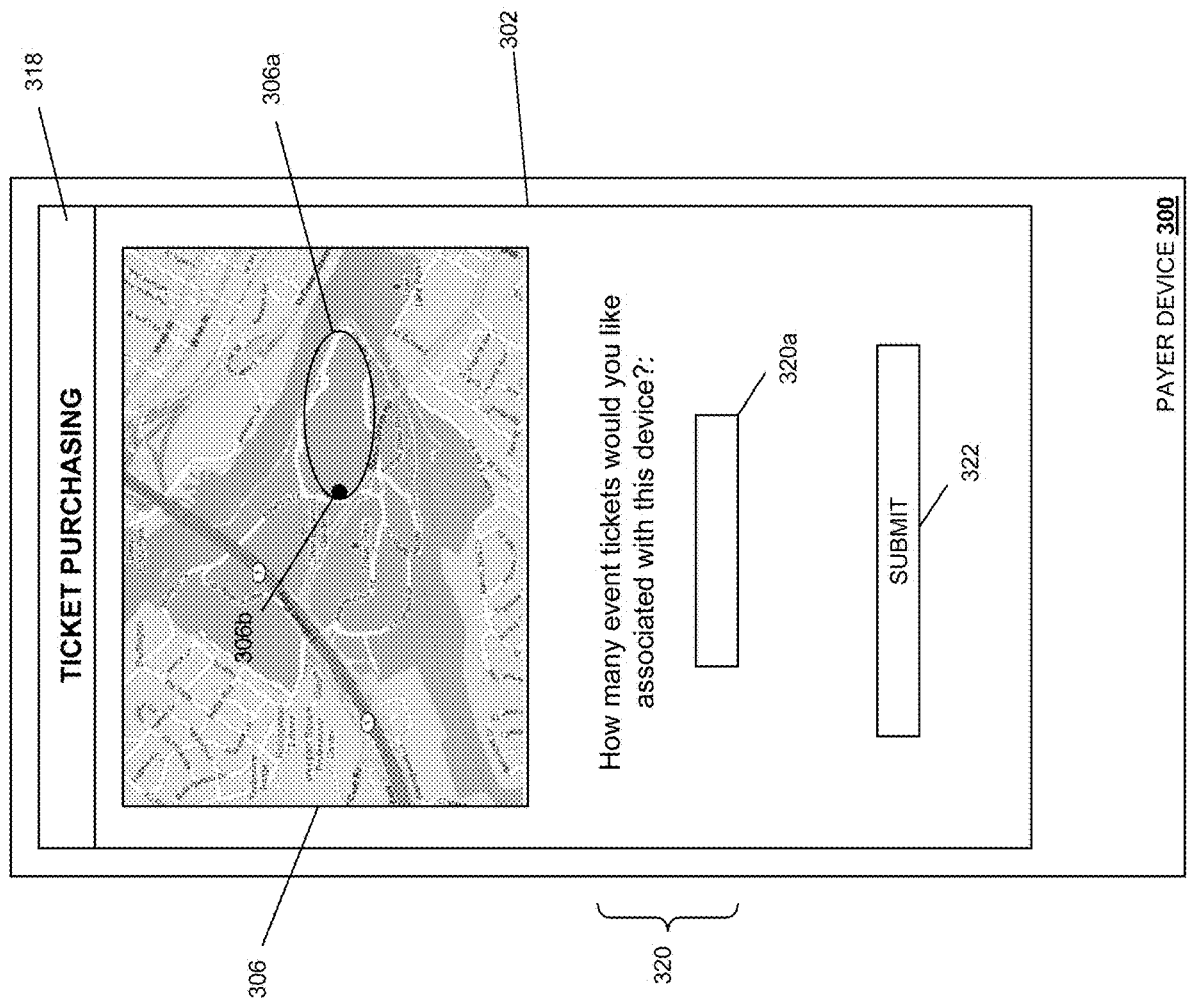
FIG. 3b is a front view illustrating an embodiment of a payer device displaying a ticket purchasing screen in response to choosing to enter an event area.

Referring now to FIGS. 1, 3a, 3b, 3c, and FIG. 4, the method 100 proceeds to block 104 where the payer device is associated with an event invoice. In response to detecting the payer device entering or attempting to enter the event area at block 102 of the method 100, the location based payer charging system 200 communicatively connects to the payer device through a network such as, for example, the Internet, the LAN provided by the networking system 204, and/or a variety of other networks known in the art. FIGS. 3a, 3b, and 3c illustrate an embodiment of a payer device 300 that is communicatively connected to the location based payer system 200. The payer device 300 includes a display 302. In response to detecting the payer device 300 in block 102 of the method 100, the location based payer charging system 200 sends a location based charge notification 304 to the payer device 300. In the illustrated embodiment, the location based charge notification 304 includes a map 306 having a graphical representation of the perimeter 306a of the event area and a payer indicator 306b that indicates where on the map 306 the payer device 300 has been detected.

The charge notification 304 also includes an information section 308 that informs the user of the payer device 300 that the payer device 300 has been detected. In the illustrated embodiment, the information section 308 includes an account number 308a that is associated with a payer account. In an embodiment, the user of the payer device 300 may have already signed into the payer account the payee, with a payment service provider, or an account provider, and the account number 308a may be retrieved using a cookie stored in the payer device 300 that associates the payer account with the payer device 300. In another embodiment, the user of the payer device 300 may have been required to sign into the payer account (e.g., when starting the application used to allow the payer device to be detected by the location based payer charging system 200, when connecting to the LAN provided by the networking system 204, etc.) such that the account number 308a is available for display on the location based charge notification 304. In another embodiment, the account number 308a may be partially obscured or even omitted from the charge notification 304.

The charge notification 304 also includes a plurality of pricing indicators 310 and 312. The pricing indicator 310 indicates that the cost of the event is $5.00/hour, while the pricing indicator 312 indicates that the cost of the event is $25.00 total for more than 5 hours. The illustrated pricing indicators 310 and 312 are directed to a time based pricing scheme. However, one of skill in the art will recognize that such time based pricing may be appropriate for some events and not for others. As such, a variety of pricing schemes are envisioned as falling within the scope of the present disclosure, such as, for example, a one time entry fee, a pay-as-you-go scheme, and/or a variety of other pricing schemes known in the art. The charge notification 304 also includes an entering confirmation button 314 and an entering denial button 316. The user of the payer device 300 may select the entering denial button 316 on the charge notification 304 to disconnect from the location based payer charging system 200.

In response to the user of the payer device 300 selecting the entering confirmation button 314 on the charge notification 304, the location based payer charging system 200 associates the payer device 300 (and the payer account that is associated with the payer device 300) with an event invoice in a database. The location based payer charging system 200 may also send a ticket purchasing screen 306, illustrated in FIG. 3b, to the payer device 300 that includes a ticket quantity section 320 having a ticket quantity input box 320a and a submit button 322. The user of the payer device 300 may provide a number of tickets they would like to purchase in the ticket quantity box 320a and select the submit button 322 in order to purchase a desired number of tickets. In response to selecting the submit button 322, the location based payer charging system 200 associates the number of tickets purchased (along with the ticket price) with the event invoice in the database and sends an electronic ticket 324, illustrated in FIG. 3c, that includes a barcode or two-dimensional code, such as a Quick Response (QR) code 324a, and a ticket quantity indicator 324b. While a specific electronic ticket 324 has been described, one of skill in the art will recognize that the electronic ticket provided by the location based payer charge system 200 in the illustrated embodiment is provided merely as a example, and electronic tickets that do not include QR codes and/or ticket quantity indicators will fall within the scope of the present disclosure.

In an embodiment, the electronic ticket 324 may be used by the user of the payer device 300 to enter the event area. For example, the user of the payer device 300 may provide the electronic ticket 324 for entry through one of the event area entrances 206 (e.g., by providing the QR code 324a to a QR code reader operated by the event provider staff). The electronic ticket 324 may also be periodically requested in the event area to confirm that the user of the payer device 300 is being charged for attending the event. In another embodiment, the electronic ticket 324 may not be used to gain entry to the event area, but rather may simply provide the payer device 300 with a receipt that confirms the purchase of a ticket to the event.

The method 100 then proceeds to block 106 where it is determined that the payer device 300 has been involved in a payer charging event, and a charge is associated with the event invoice that is associated with that payer device 300. For example, in the illustrated embodiment, discussed above, once the payer device 300 enters the event area, the location based charging system 200 may begin tracking the amount of time the payer device 300 has been located in the event area. As discussed above with regard to the illustrated embodiment, any time spent in the event area may be considered a payer charging event, as the event charges the payer based on the amount of time spent in the event area, and thus the event invoice associated with the payer device 300 will be associated with a charge for any amount of time spent in the event area.

The method 100 then proceeds to block 108 where the payer device is detected leaving or attempting to leave the event area and the payment account associated with the payer device is charged for the event invoice. As the payer device 300 approaches the perimeter 202 of the event area 200, the payer device 300 is detected by the location based payer charging system 200 as leaving or attempting to leave the event area. In an embodiment, as discussed above, the payer device 300 may include an application that allows the payer device 300 to be used in the location based payer charging system 200. In such an embodiment, the application has access to the GPS coordinates provided by the payee/event provider to define the event area, and the application monitors the location of the payer device 300 (e.g., using a GPS device in the payer device 300) to determine whether the payer device 300 is within a predetermined distance of the perimeter of the event area. Once within the predetermined distance of the event area, the application communicates with the location based payer charging system 200 such that the payer device 300 is detected as leaving or attempting to leave the event area by the location based charging system 200. In another embodiment, the payer device 300 may be connected to the location based payer charging system 200 through the LAN and/or a cellular communications link that allows the location based payer charging system 200 to monitor the location of the payer device 300 to determine that payer device 300 is leaving or attempting to leave the event area. While a few examples of systems and methods to detect the payer device have been provided, one of skill in the art will recognize that these should not be viewed as limiting, and a variety of other systems and methods to detect that the payer device is leaving or attempting to leave the event area will fall within the scope of the present disclosure.

Figure 4:
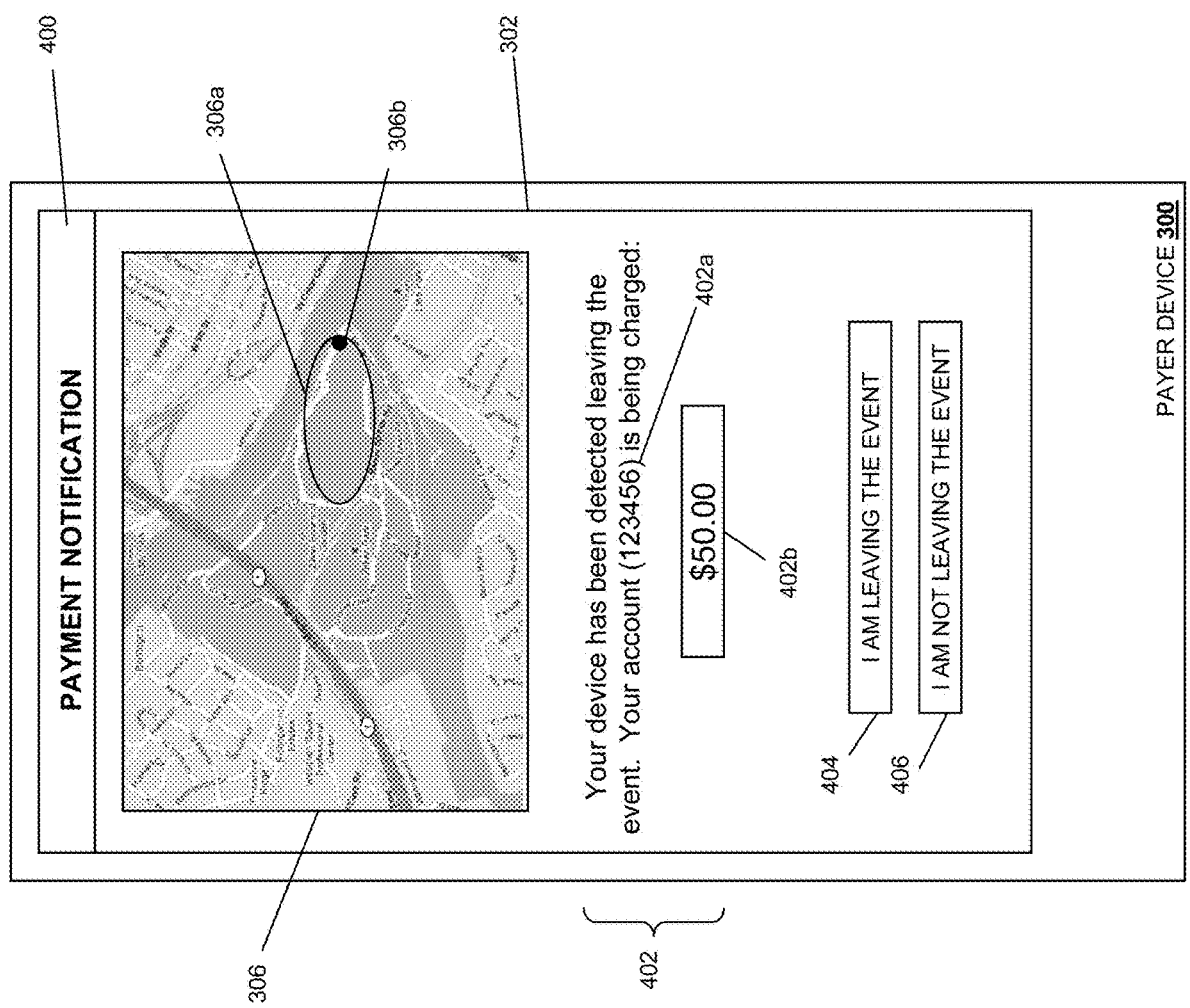
FIG. 4 is a front view illustrating an embodiment of a payer device displaying an notification in response to being detected leaving or attempting to leave the event area.

In response to detecting the payer device 300 leaving or attempting to leave the event area at block 108 of the method 100, the location based payer charging system 200 sends a payment notification 400, as illustrated in FIG. 4, to the payer device 300. In the illustrated embodiment, the payment notification 400 includes the map 306 that includes the graphical representation of the perimeter 306a of the event area and the payer indicator 306b that indicates where on the map 306 the payer device 300 has been detected. The payment notification 400 also includes an event invoice area 402 that may include an account number 402a of the payer account that the event invoice will be charged to, a total amount 402b of the event invoice that will be charged to the payer account, a leaving event confirmation button 404, and a leaving event decline button 406. The user of the payer device 300 may select the leaving event decline button 406 if, for example, the payer device 300 was mistakenly brought too close to the perimeter 202 of the event area. The user of the payer device 300 may select the leaving event confirmation button 404 to confirm that the user of the payer device 300 is leaving the event area and that the payment for the total amount 402b of the event invoice should be charged to the payer account associated with the payer device 300. The location based charging system 200 will charge the payer account for the event invoice. In an embodiment, charging the payer account for the event invoice may include the payee/event provider or other operator of the location based payer charging system 200 sending a request to the account provider or the payment service provider to charge the account. Alternatively, the user of the payer device 300 may simply leave the event area and, in response, the location based payer charging system 200 will detect that the payer device 300 is no longer in the event area and charge the payer account for the event invoice.

Figure 5A:
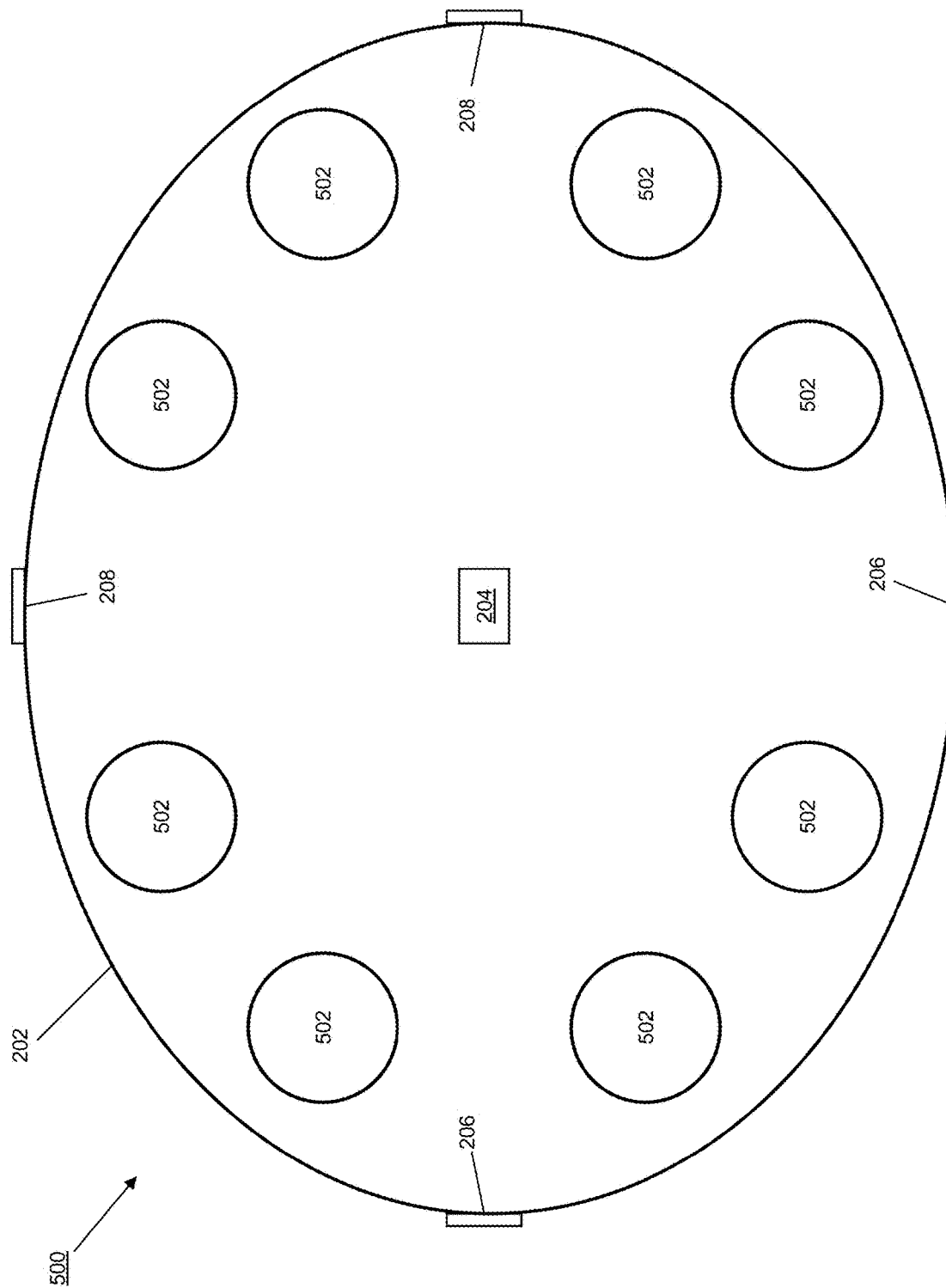
FIG. 5a is a schematic view illustrating an embodiment of event area including a plurality of pay areas within the event area.
Figure 5B:
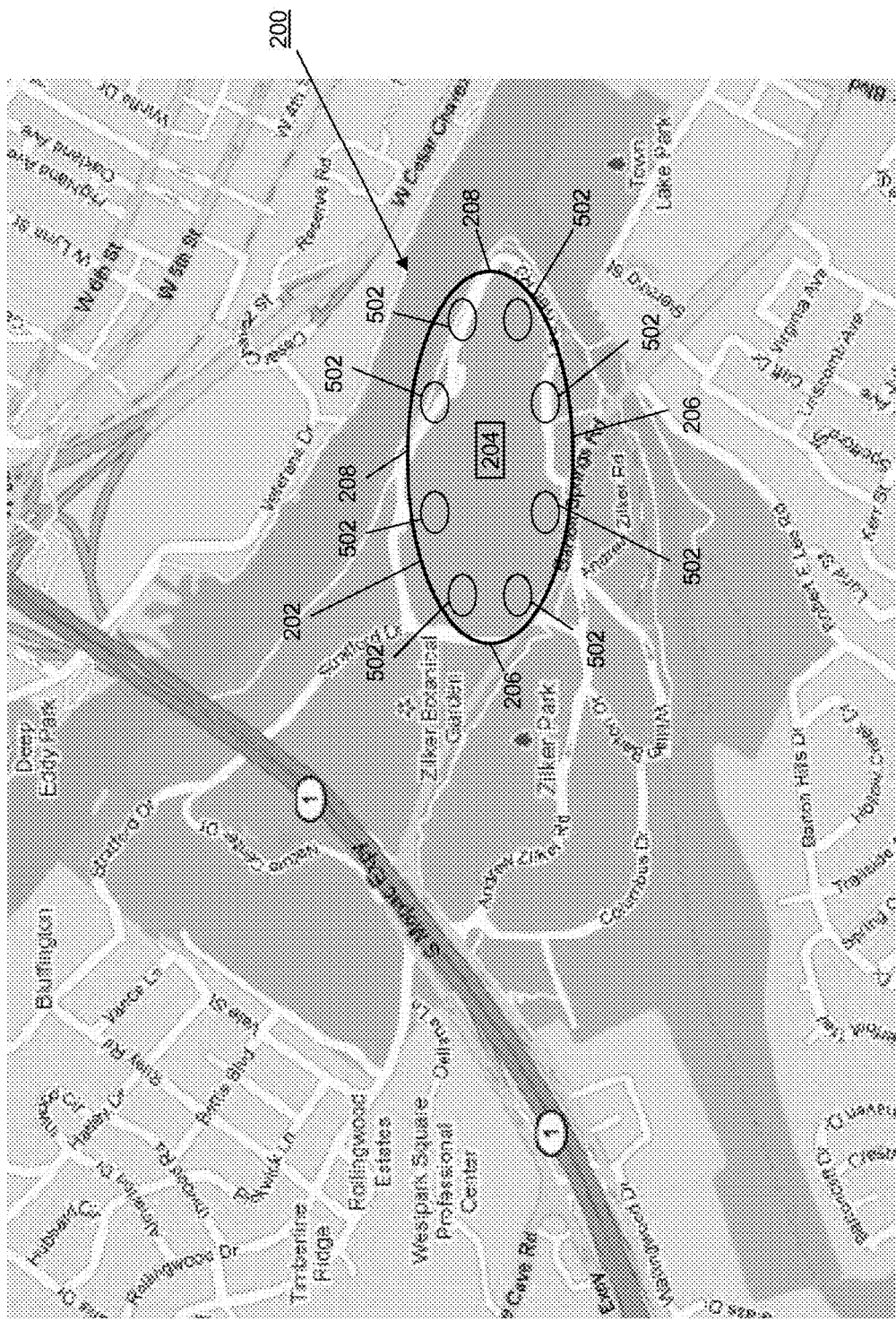

Referring now to FIGS. 5a, 5b, 5c, and 5d, an alternative embodiment of a payer charging event that the payer device 300 may be involved in at block 106 of the method 100 is illustrated. The payer charging event may occur in a location based payer charging system 500 that is substantially similar to the location based payer charging system 200 discussed above, but with the provision of a plurality of pay areas 502 within the event area, as illustrated in FIG. 5a. In an embodiment, the payee/event provider may define the pay areas 502 using a plurality of positioning coordinates in a manner similar to that used to define the event area (e.g., defining a perimeter, defining the area itself, defining entrances and exits to the pay areas, etc.). For example, FIG. 5b illustrates how the pay areas 502 may be defined using a plurality of Global Positioning System (GPS) coordinates on a map. One of skill in the art will recognize that a variety of different sized and shaped boundaries (e.g., the circular shaped boundary provided by the perimeter of the pay areas 502 in the illustrated embodiment) may be created to define one or more pay areas 502 while remaining within the scope of the present disclosure.

At block 106 of the method 100, the payer including the payer device 300 approaches the perimeter of one of the pay areas 502 and is detected by the location based payer charging system 500 as entering or attempting to enter that pay area 502. As discussed above, the payer device 300 may include an application that allows the payer device 300 to be used in the location based payer charging system 200. In such an embodiment, the application is updated with the GPS coordinates provided by the payee/event provider to define the pay areas 502, and the application monitors the location of the payer device 300 (e.g., using a GPS device in the payer device 300) to determine whether the payer device 300 is within a predetermined distance of one of the pay areas 502. Once within the predetermined distance of one of the pay areas 502, the application communicates with the location based payer charging system 500 such that the payer device 300 is detected as entering or attempting to enter that pay area 502 by the location based charging system 500. In another embodiment, the payer device 300 may have detected the LAN provided by the networking system 204 when entering the event area such that the payer device 300 is connected to the LAN or another communications link such as, for example, a cellular communications link that is used to communicate with the payer device to determine the location of the payer device 300. While a few examples of systems and methods to detect the payer device 300 have been provided, one of skill in the art will recognize that these should not be viewed as limiting, and a variety of other systems and methods to detect that the payer device is entering or attempting to enter a pay area 502 will fall within the scope of the present disclosure.

Figure 5C:
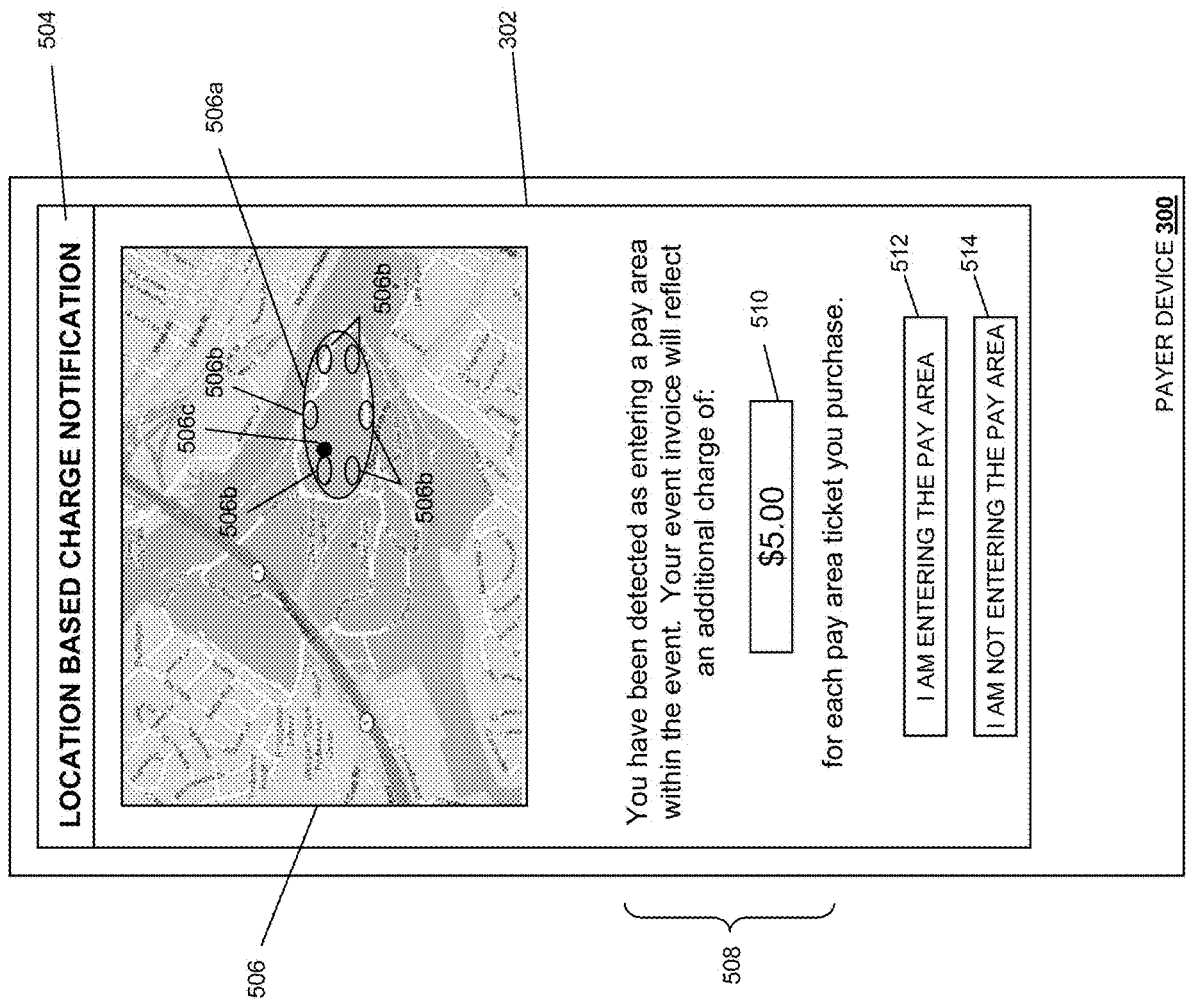
FIG. 5c is a front view illustrating an embodiment of a payer device displaying a notification in response to being detected entering or attempting to enter a pay area.

In response to detecting the payer device 300 entering or attempting to enter the pay area 502 in block 106 of the method 100, the location based payer charging system 500 sends a location based charge notification 504 to the payer device 300, as illustrated in FIG. 5c. In the illustrated embodiment, the location based charge notification 504 includes a map 506 that includes a graphical representation of the event area 506a, each of the pay areas 506b within the event area, and a payer indicator 506c that indicates where on the map 506 the payer device 300 has been detected.

The charge notification 504 also includes an information section 508 that informs the user of the payer device 300 that the payer device 300 has been detected as entering or attempting to enter the pay area 502. In the illustrated embodiment, the information section 508 includes a pricing indicator 510 that includes an amount that will be added to the event invoice associated with the payer device 300 and payer account if the user of the payer device chooses to enter the pay area 502. The pricing indicator 310 indicates that the cost of the pay area is $5.00. The illustrated pricing indicator 510 is directed to a flat fee pricing scheme for a particular location in the event area. However, one of skill in the art will recognize that flat fee pricing may be appropriate for some pay areas or event areas and not for others. As such, a variety of pricing schemes are envisioned as falling within the scope of the present disclosure. The charge notification 304 also includes an entering confirmation button 512 and an entering denial button 514. The user of the payer device 300 may select the entering denial button 514 on the charge notification 504 to inform the location based payer charging system 500 that the payer does not wish to enter or be charged for the pay area 502.

In response to the user of the payer device 300 selecting the entering confirmation button 512 on the charge notification 504, the location based payer charging system 500 may send a ticket purchasing screen 518, illustrated in FIG. 5d, to the payer device 300 that includes a ticket quantity section 520 having a ticket quantity input box 520a and a submit button 522. The user of the payer device 300 may provide a number of tickets they would like to purchase to enter the pay area 502 in the ticket quantity box 520a and select the submit button 522 in order to purchase those tickets. In response to selecting the submit button 522, the location based payer charging system 500 adds a charge for the number of tickets purchased to the event invoice that is associated with the payer device 300 and payer account, and sends an electronic ticket 524, illustrated in FIG. 5e, to the payer device 300 that includes an image 526 and a ticket quantity indicator 528 (e.g., the charge added to the event invoice in the illustrated embodiment would be $20.00 for 4 tickets purchased at $5.00 per ticket). While a specific electronic ticket 524 has been described, one of skill in the art will recognize that the electronic ticket provided by the location based payer charge system 500 is provided merely as a example, and electronic tickets that do not include images and/or ticket quantity indicators will fall within the scope of the present disclosure.

In an embodiment, the electronic ticket 524 may be used by the user of the payer device 500 to enter the pay area 502. For example, the location based payer charging system 500 may send the image 526 to a display device in the pay area 502 that the user of the payer device is attempting to enter, and the user of the payer device 300 may provide the electronic ticket 524 displayed on the payer device 300 to enter the pay area 502. A pay area operator in the pay area 502 may then check the image 526 on the payer device 300 to determine whether it matches the image on the display device in the pay area 502. The image 526 provided to each of the payer device 300 and to the display device in the pay area 502 may be periodically changed by the location based payer charging system 500 for security purposes. In another embodiment, the electronic ticket 524 may not be used to gain entry to the pay area 502, but rather may simply provide the payer device 300 with a receipt that confirms the purchase of a ticket to the pay area 502.

Figure 6A:
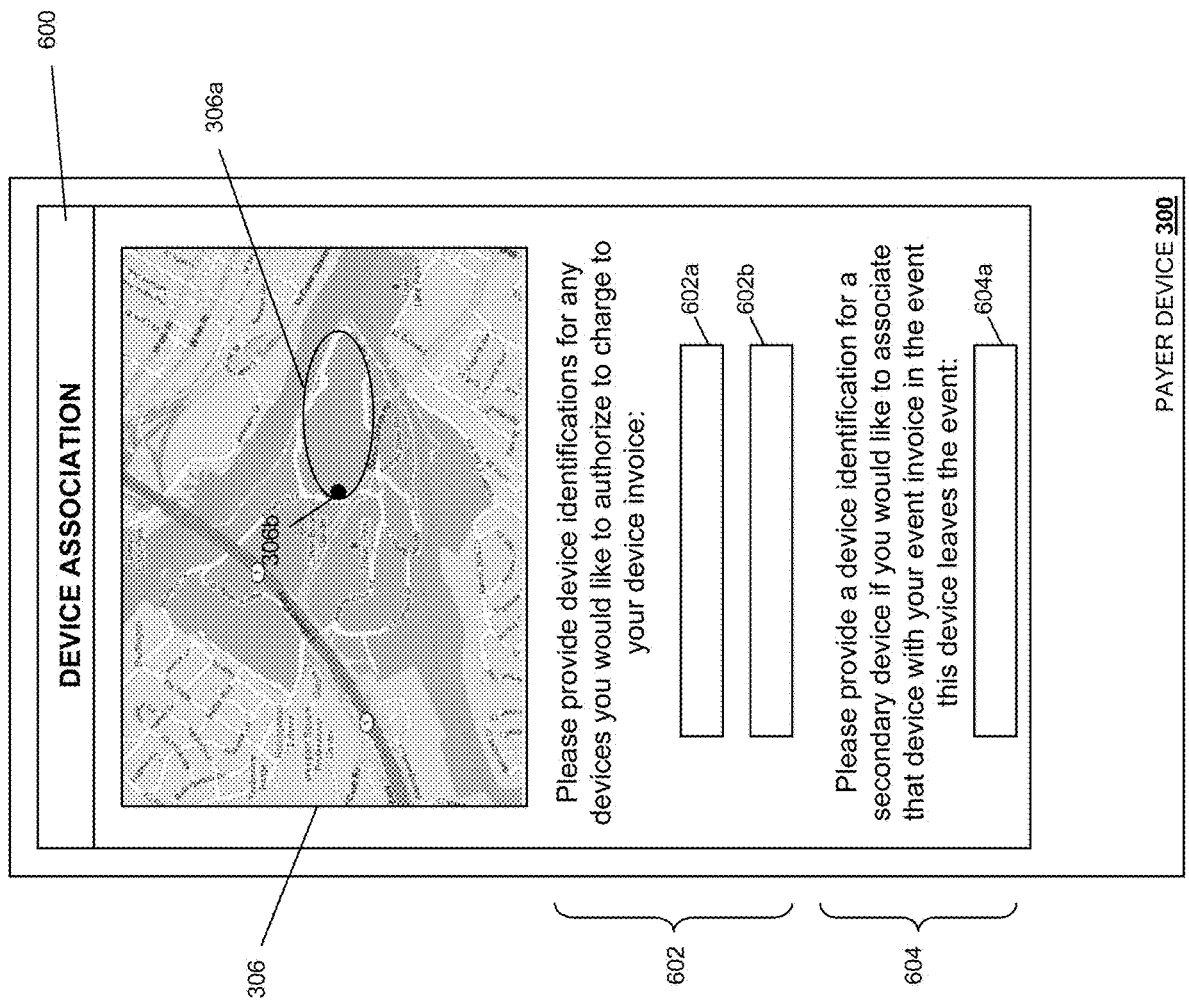
FIG. 6a is a front view illustrating an embodiment of a payer device displaying an associated device screen in response to entering or attempting to enter an event area.
Figure 6B:
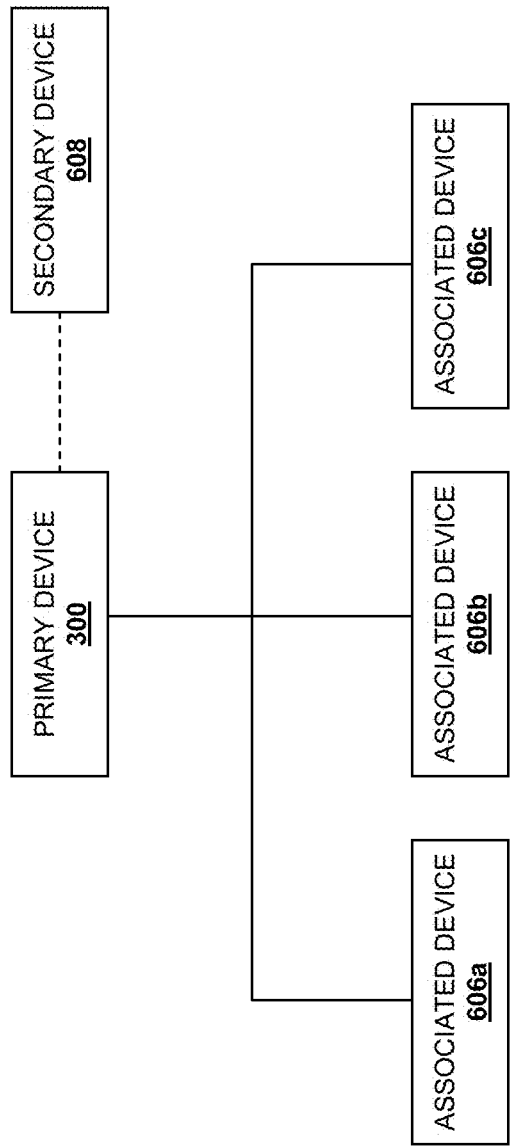
FIG. 6b is a schematic view illustrating an embodiment of a primary payer device linked with a secondary payer device and a plurality of associated payer devices.

Referring now to FIGS. 6a and 6b, the location based charging system 200 and/or 500 may allow the payer device 300 to associate other devices with the event invoice. For example, at block 104 of the method 100, the location based payer charging system 200 may provide the payer device 300 with a device association screen 600 that includes a device association section 602 and a secondary device designation section 604, as illustrated in FIG. 6a. The device association section 602 includes instructions to provide device identifications for devices to associate with the event invoice, along with a plurality of associated device input boxes 602a and 602b. The secondary device designation section 604 includes instructions to provide a device identification for a secondary device to associate with the event invoice in the event the payer device 300 leaves the event area, along with a secondary device input box 604a. As illustrated in FIG. 6b, the user of the payer device 300 may associate a plurality of associated device 606a, 606b, and 606c with the event invoice by providing device identifications for each of the associated device 606a, 606b, and 606c in the associated device input boxes 602a and 602b. The user of the payer device 300 may also associate a secondary device 606 with the event invoice by providing a device identification in the secondary device input box 604a. In an embodiment, device identifications for the associated devices and secondary device may include phone numbers for the devices, email addresses associated with the devices, usernames associated with the devices (and, for example, an application on each of the devices used to detect and/or track that device in the event area), and/or a variety of other device identifications known in the art.

One of skill in the art will recognize that the association of associated devices and a secondary device with the event invoice provides a variety of benefits. For example, a family may include a parent with the payer device 300, another parent with the secondary device 608, and children with the associated devices 606a, 606b, and 606c. Once each of the devices has been associated with the event invoice, the parents and children may split up within the event area, leave the event area at different times, enter different pay areas, etc. In one example, the parent with the primary device 300 may take one of the children with the associated device 606a to a particular pay area in the event area, while the parent with the secondary device 608 may go to a location in the event area alone, and the two children with the associated devices 606b and 606c may go to particular pay areas in the event area. All payer charging events detected by the payer device 300, the secondary device 608, and the associated devices 606a, 606b, and 606c will result in charges added to the single event invoice that is associated with the payer device 300. Furthermore, in the event the primary device 300 leaves the event area, the event invoice will then be associated with the secondary device 608 such that, for example, the associated device 606a, 606b, and 606c may still add charges to the event invoice after the payer device 300 has left the event area.

Referring now to FIG. 7, while in the event area, the location based payer charging system 200 may send the payer device 300 an event invoice warning 700 that includes a spending warning section 702 having an current event invoice amount 702a, along with an allow further charges button 704 and a disable further charges button 706. In an embodiment, the user of the payer device 300 may set a spending limit that is associated with the event invoice, and the location based payer charging system 200 will send the event invoice warning 700 in response to detecting that spending limit being reached. In response to receiving the event invoice warning 700, the user of the payer device 300 may select the allow further charges button 704 to allow further charges to be added to the event invoice, or select the disable further charges button 706 to prevent further charges from being added to the event invoice. If the event invoice is being charged based on an amount of time the payer device 300 is located in the event area, the payer device 300 may be sent a message to leave the event area in order to prevent further charges to the event invoice. In an embodiment, the location based notification 700 provides benefits when the event invoice is associated with associated devices and/or a secondary device (as discussed above with reference to FIGS. 6a and 6b), as charges added to the event invoice by the associated devices and/or a secondary device may be monitored or capped by the user of the payer device 300. In an embodiment, the event invoice warning 700 may include a listing of the different charges including the details of each charge (e.g., the name and/or cost of a pay area entered.)

Thus, a location based payer charging system has been described that allows a payer device to be charged based on the location of the payer device within an event area and/or pay areas within the event area. Through the association of the an event invoice with the payer device, associated devices, and/or secondary devices, charges may be added to the event invoice as the devices enter and leave the event area or pay areas within the event area, providing a simple and easy method for charging one or more persons in the event area.

The location based payer charging systems discussed above provide substantial benefits to charging payers for a variety of events. For example, the location based payer charging system including the plurality of pay areas within the event area provide for charging a payer for specific areas of the event, which may be useful for rides or shows at a fair, carnival, or amusement park, acts or shows at a music festival, and/or monuments or sights (e.g., a waterfall) at a national park. The time-based pricing scheme discussed above with reference to the location based payer charging system 200 may be useful for charging payers for time spent at a fair, carnival, amusement park, music festival, a national park, or sporting event. While a number of events have been provided as examples, one of skill in the art will recognize that a variety of other events will see substantial benefits to incorporating the location based payer charging system. Furthermore, the location based payer charging system may provide additional benefit due to its knowledge of the payer device location and its communicative connection to the payer device. For example, the location based payer charging system may detect that the payer device is located in a particular area of the event area and, in response, provide the payer device with information (e.g., text, images, web links, etc.) about that area (e.g., information about a monument in a sightseeing area may be provided to the payer device when the payer device is located at or near that monument.)

Figure 8:
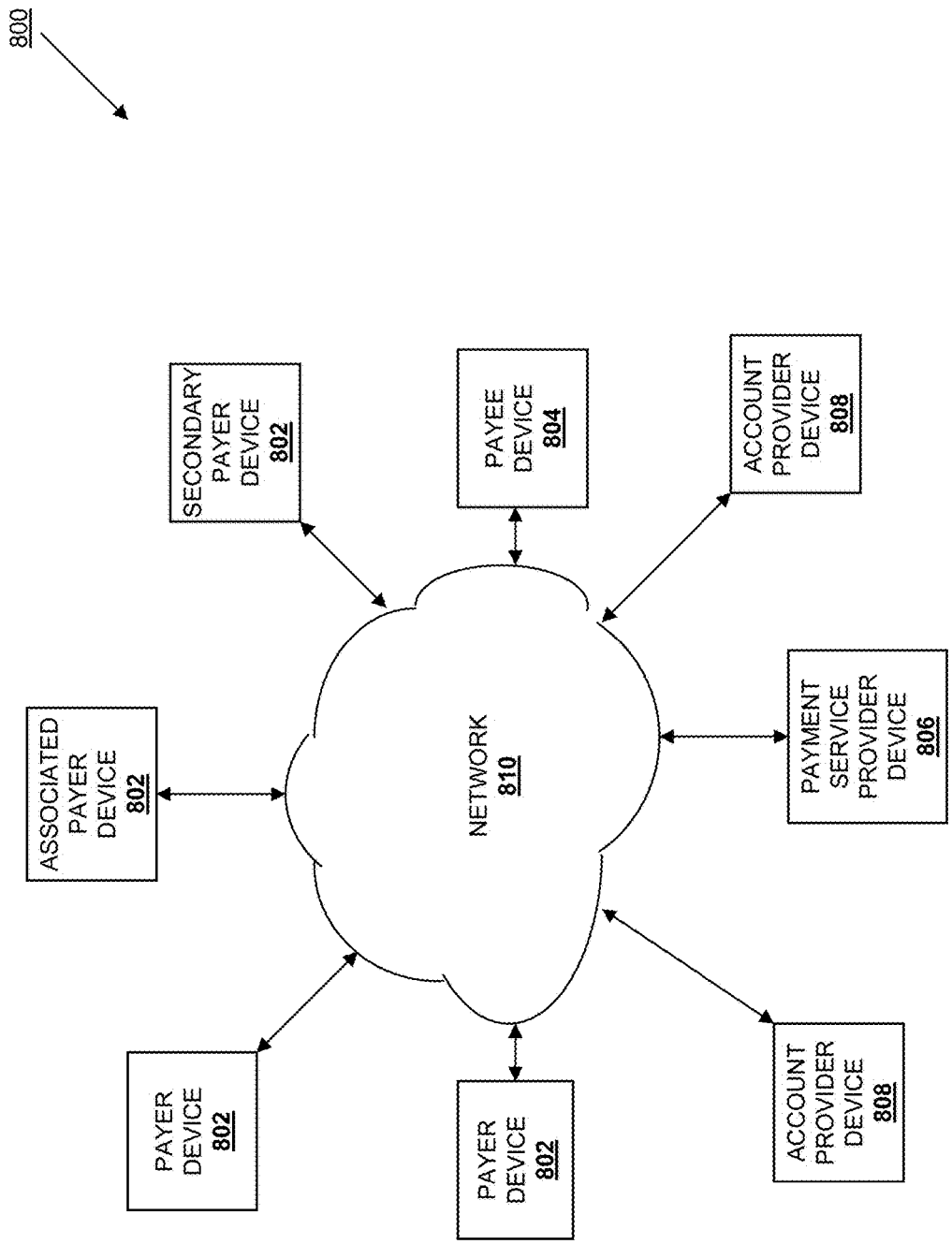
FIG. 8 is a schematic view illustrating an embodiment of a networked system.

Referring now to FIG. 8, an embodiment of a networked system 800 used in the location based payer charging system described above is illustrated. The networked system 800 includes a plurality of payer devices 802 (including associated payer devices and secondary payer devices), a payee device 804, a payment service provider device 806, and a plurality of account holder devices 808 in communication over a network 810. Any of the payer devices 802 may be the payer device 300, discussed above. The payee device 804 may be a payee device operated by the payee/event provider discussed above. The payment service provider device 806 may be operated by a payment service provider such as, for example, PayPal Inc. of San Jose, Calif. The account provider devices 808 may be account provider devices operated by the account providers such as, for example, credit card account providers, bank account providers, savings account providers, and a variety of other account providers known in the art.

The payer devices 802, payee device 804, payment service provider device 806, and account provider devices 808 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 800, and/or accessible over the network 810.

The network 810 may be implemented as a single network or a combination of multiple networks. For example, in various embodiments, the network 810 may include the Internet and/or one or more intranets, landline networks, wireless networks, and/or other appropriate types of networks.

The payer device 802 may be implemented using any appropriate combination of hardware and/or software configured for wired and/or wireless communication over network 810. For example, in one embodiment, the payer device 802 may be implemented as a personal computer of a user in communication with the Internet. In other embodiments, the payer device 802 may be a smart phone, personal digital assistant (PDA), laptop computer, and/or other types of computing devices.

The payer device 802 may include one or more browser applications which may be used, for example, to provide a convenient interface to permit the payer to browse information available over the network 810. For example, in one embodiment, the browser application may be implemented as a web browser configured to view information available over the Internet.

The payer device 802 may also include one or more toolbar applications which may be used, for example, to provide user-side processing for performing desired tasks in response to operations selected by the payer. In one embodiment, the toolbar application may display a user interface in connection with the browser application.

The payer device 802 may further include other applications as may be desired in particular embodiments to provide desired features to the payer device 802. In particular, the other applications may include a payment application for payments assisted by a payment service provider through the payment service provider device 806. The other applications may also include security applications for implementing user-side security features, programmatic user applications for interfacing with appropriate application programming interfaces (APIs) over the network 810, or other types of applications. Email and/or text applications may also be included, which allow the payer to send and receive emails and/or text messages through the network 810. The payer device 802 includes one or more user and/or device identifiers which may be implemented, for example, as operating system registry entries, cookies associated with the browser application, identifiers associated with hardware of the payer device 802, or other appropriate identifiers, such as a phone number. In one embodiment, the user identifier may be used by the payment service provider device 806 and/or account provider device 808 to associate the user with a particular account as further described herein.

The payee device 804 may be maintained, for example, by the payee/event provider, a conventional or on-line merchant, conventional or digital goods seller, individual seller, and/or application developer offering various products and/or services in exchange for payment to be received conventionally or over the network 810. In this regard, the payee device 804 may include a database identifying available event areas, pay areas, products, and/or services (e.g., collectively referred to as items) which may be made available for viewing and purchase by the payer.

The payee device 804 also includes a checkout application which may be configured to facilitate the purchase by the payer of items or entry into event areas or pay areas. The checkout application may be configured to accept payment information from the user through the payer device 802, the account provider through the account provider device 808, and/or from the payment service provider through the payment service provider device 806 over the network 810.

Figure 9:
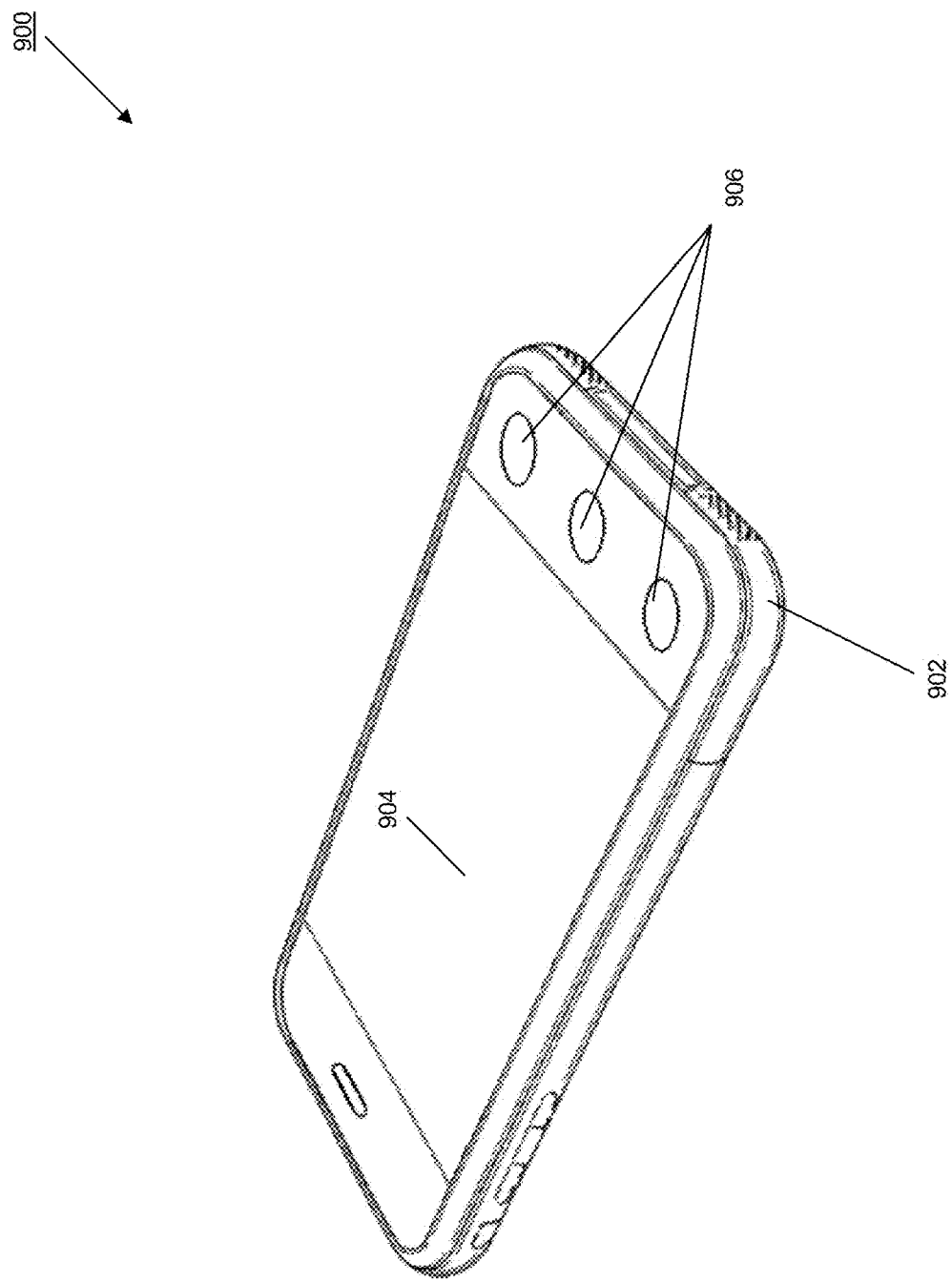
FIG. 9 is a perspective view illustrating an embodiment of a payer device.

Referring now to FIG. 9, an embodiment of a payer device 900 is illustrated. The payer device 900 may be the payer devices 300 and/or 802. The payer device 900 includes a chassis 902 having a display 904 and an input device including the display 904 and a plurality of input buttons 906. One of skill in the art will recognize that the payer device 900 is a portable or mobile phone including a touch screen input device and a plurality of input buttons that allow the functionality discussed above with reference to the method 100. However, a variety of other portable/mobile payer devices may be used in the method 100 without departing from the scope of the present disclosure.

Figure 10:
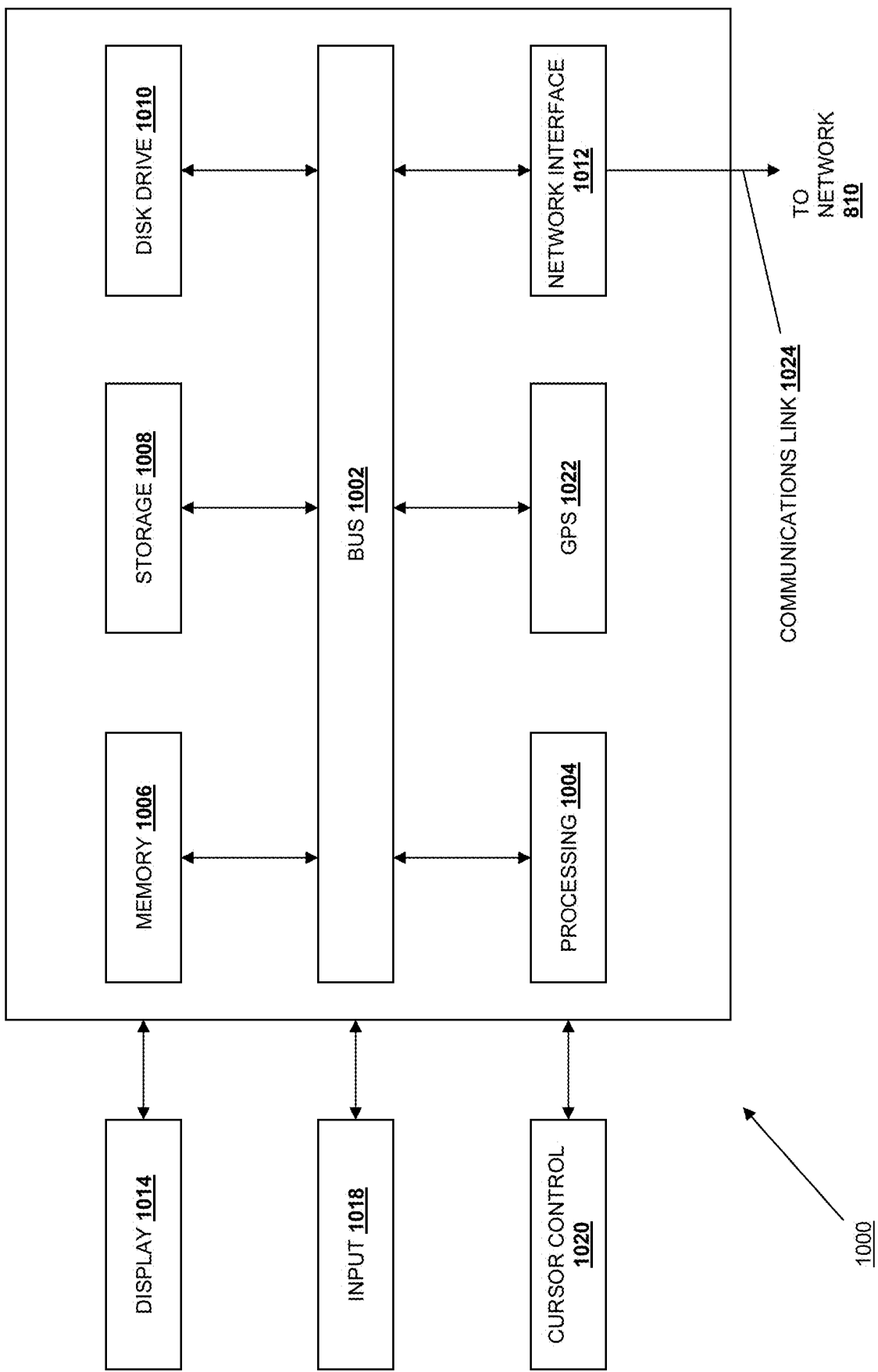
FIG. 10 is a schematic view illustrating an embodiment of a computer system.

Referring now to FIG. 10, an embodiment of a computer system 1000 suitable for implementing, for example, the payer device 300, the payer device 802, the payee device 804, the payment service provider device 806, and/or the account provider device 808, is illustrated. It should be appreciated that other devices utilized by payer, payees, payment service providers, and account providers in the payment system discussed above may be implemented as the computer system 1000 in a manner as follows.

In accordance with various embodiments of the present disclosure, computer system 1000, such as a computer and/or a network server, includes a bus 1002 or other communication mechanism for communicating information, which interconnects subsystems and components, such as a processing component 1004 (e.g., processor, micro-controller, digital signal processor (DSP), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard), a cursor control component 1020 (e.g., mouse, pointer, or trackball), and/or a location determination component 1022 (e.g., a Global Positioning System (GPS) device as illustrated, a cell tower triangulation device, and/or a variety of other location determination devices known in the art.) In one implementation, the disk drive component 1010 may comprise a database having one or more disk drive components.

In accordance with embodiments of the present disclosure, the computer system 1000 performs specific operations by the processor 1004 executing one or more sequences of instructions contained in the memory component 1006, such as described herein with respect to the payer device 300, 700, and 802, the payee device(s) 804, the payment service provider device 806, and/or the account provider device(s) 808. Such instructions may be read into the system memory component 1006 from another computer readable medium, such as the static storage component 1008 or the disk drive component 1010. In other embodiments, hard-wired circuitry may be used in place of or in combination with software instructions to implement the present disclosure.

Logic may be encoded in a computer readable medium, which may refer to any medium that participates in providing instructions to the processor 1004 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1010, volatile media includes dynamic memory, such as the system memory component 1006, and transmission media includes coaxial cables, copper wire, and fiber optics, including wires that comprise the bus 1002. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1000. In various other embodiments of the present disclosure, a plurality of the computer systems 1000 coupled by a communication link 1024 to the network 810 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1000 may transmit and receive messages, data, information and instructions, including one or more programs (i.e., application code) through the communication link 1024 and the network interface component 1012. The network interface component 1012 may include an antenna, either separate or integrated, to enable transmission and reception via the communication link 1024. Received program code may be executed by processor 1004 as received and/or stored in disk drive component 1010 or some other non-volatile storage component for execution.

Figure 11:
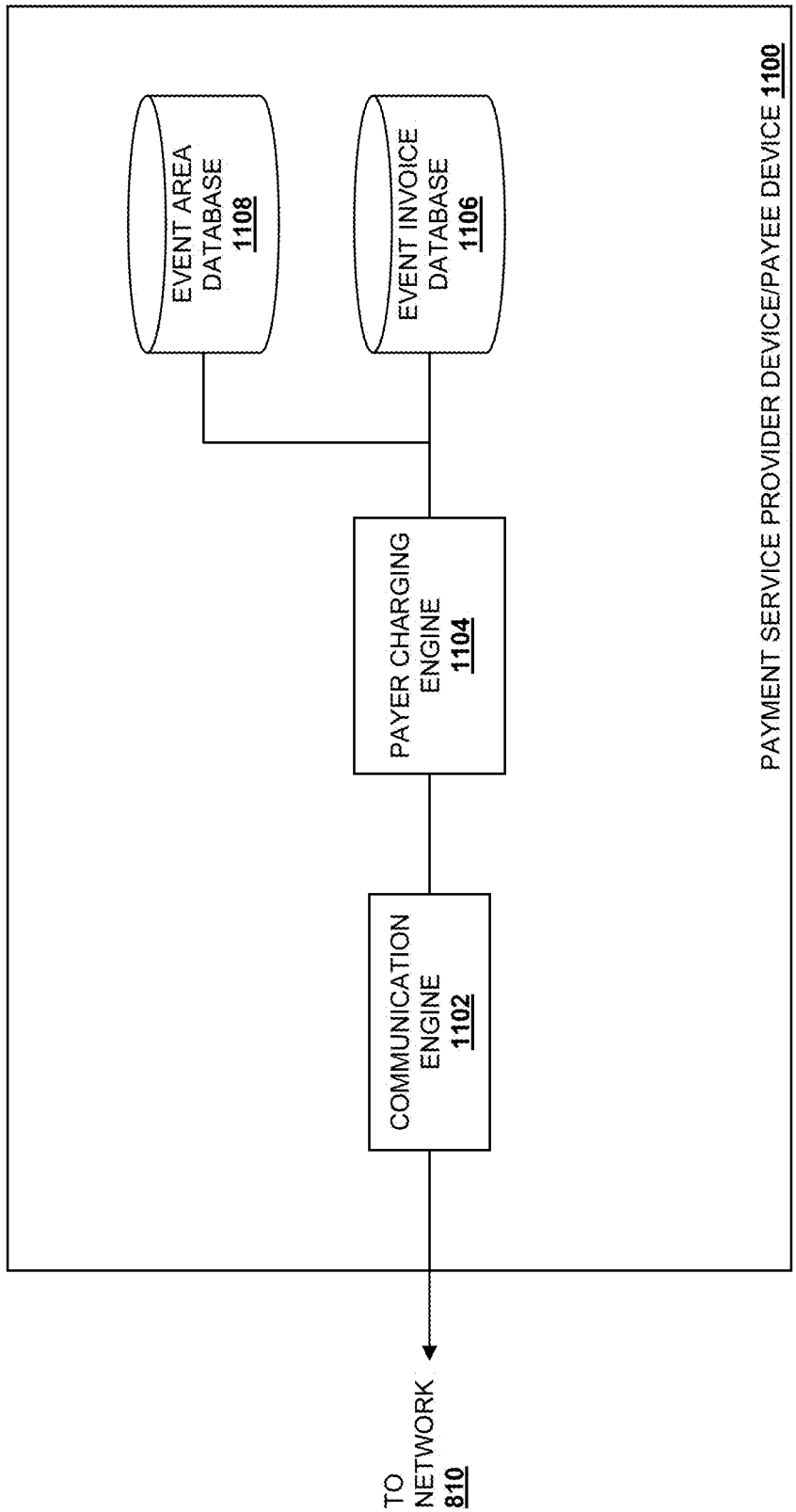
FIG. 11 is a schematic view illustrating an embodiment of a user device, payment service provider device, and/or an account provider device.

Referring now to FIG. 11, an embodiment of a payment service provider device/payee device/location based payer charging system device 1100 is illustrated. The device 1100 includes a communication engine 1102 that is coupled to the network 810 and to an payer charging engine 1104 that is coupled to an event invoice database 1106 and an event area database 1108. The communication engine 102 may be software or instructions stored on a computer-readable medium that allows the device 1100 to send and receive information over the network 810. The payer charging engine 1104 may be software or instructions stored on a computer-readable medium that is operable to receive event area and pay area positioning coordinates and store them in the event area database 1108, receive and associate event invoices with payer devices and payers accounts in the event invoice database 1106, receive payer device locations, determine payer charging events, add charges to the event invoices, and provide any of the other functionality that is discussed above. While the databases 1106 and 1108 have been illustrated as located in the payer device 1100, one of skill in the art will recognize that they may be connected to the payer charging engine 1104 through the network 810 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An event invoice charging and payment system, comprising:
    a wireless communication system;
    a non-transitory memory storing a plurality of event invoices; and
    at least one hardware processor that is coupled to the wireless communication system and the non-transitory memory and that is configured to execute instructions to cause the event invoice charging and payment system to:
        detect, using the wireless communication system, a first mobile payer device entering an event area from outside the event area and, in response, use the wireless communication system to cause a graphical user interface to display on the first mobile payer device;
        create a first event invoice that is one of the plurality of event invoices in the non-transitory memory, and associate a first identifier of the first mobile payer device with the first event invoice in response to receiving an indication from the first mobile payer device of a confirmation made through the graphical user interface;
        associate a second identifier for a second mobile payer device with the first event invoice in the non-transitory memory in response to receiving an indication of the second mobile payer device from the first mobile payer device made through the graphical user interface;
        communicate, with the first mobile payer device and the second mobile payer device using the wireless communication system, to determine that each of the first mobile payer device and the second mobile payer device has been involved in at least one charging event that is based on their location in the event area;
        determine a charge associated with the second mobile payer device, wherein the charge is incurred in response to the second mobile payer device entering a charging event location for the corresponding charging event;
        assign the charge associated with the second mobile payer device to the first event invoice in the non-transitory memory associated with the first identifier of the first mobile payer device; and
        cause a payment to be made for the first event invoice from a payer account associated with the first mobile payer device.

2. The system of claim 1, wherein the wireless communication system includes a plurality of wireless networking devices that are positioned in the event area and configured to provide a wireless network in the event area.

3. The system of claim 2, wherein the wireless network provided by the plurality of wireless networking devices is a wireless local area network (LAN) and the detecting the first mobile payer device entering the event area occurs in response to the first mobile payer device connecting to the wireless LAN.

4. The system of claim 1, wherein the graphical user interface provides at least one pricing scheme and a confirmation element that is selectable to provide the indication from the first mobile payer device of the confirmation.

5. The system of claim 1, wherein the at least one hardware processor is configured to execute instructions to cause the event invoice charging and payment system to further:
    cause, using the wireless communication system, the graphical user interface to further display on the second mobile payer device, wherein the determining that each of the first mobile payer device and the second mobile payer device has been involved in the at least one charging event that is based on their location in the event area is performed in response to receiving a payment confirmation through the graphical user interface from each of the first mobile payer device and the second mobile payer device.

6. The system of claim 1, wherein
    the causing the payment to be made for the first event invoice from the payer account is performed in response to detecting, using the wireless communication system, the first mobile payer device leaving the event area.

7. The system of claim 1, wherein the first identifier of the first mobile payer device includes a first phone number, and wherein the second identifier of the second mobile payer device includes a second phone number.

8. A method for event invoice charging and payment, comprising:
    detecting, using a wireless communication system, a first mobile payer device entering an event area from outside the event area and, in response, using the wireless communication system to cause a graphical user interface to display on the first mobile payer device;

creating a first event invoice and associating a first identifier of the first mobile payer device with the first event invoice in response to receiving an indication from the first mobile payer device of a confirmation made through the graphical user interface;

associating a second identifier for a second mobile payer device with the first event invoice in response to receiving an indication of the second mobile payer device from the first mobile payer device made through the graphical user interface;

determining that the second mobile payer device has entered a charging event location in the event area;

determining a charge associated with the second mobile payer device, wherein the charge is incurred in response to the second mobile payer device entering the charging event location in the event area;

assigning the charge associated with the second mobile payer device to the first event invoice associated with the first identifier of the first mobile payer device; and causing a payment to be made for the first event invoice from a payer account associated with the first mobile payer device.

9. The method of claim 8, wherein the wireless communication system includes a plurality of wireless networking devices that are positioned in the event area and configured to provide a wireless network in the event area.

10. The method of claim 9, wherein the wireless network provided by the plurality of wireless networking devices is a wireless local area network (LAN) and the detecting the first mobile payer device entering the event area occurs in response to the first mobile payer device connecting to the wireless LAN.

11. The method of claim 8, wherein the graphical user interface provides at least one pricing scheme and a confirmation element that is selectable to provide the indication from the first mobile payer device of the confirmation.

12. The method of claim 8, further comprising:
causing, using the wireless communication system, the graphical user interface to further display on the second mobile payer device, wherein the determining that the second mobile payer device has entered a charging event location in the event area is performed in response to receiving a payment confirmation through the graphical user interface from the at least one of the first mobile payer device or the second mobile payer device.

13. The method of claim 8,
wherein the causing the payment to be made for the first event invoice from the payer account is performed in response to detecting, using the wireless communication system, the first mobile payer device leaving the event area.

14. The method of claim 8, wherein the first identifier of the first mobile payer device includes a first phone number, and wherein the second identifier of the second mobile payer device includes a second phone number.

15. A non-transitory machine-readable medium having stored thereon machine-readable instructions executable to cause a machine to perform operations comprising:
detecting, using a wireless communication system, a first mobile payer device entering an event area from outside the event area and, in response, causing a graphical user interface to display on the first mobile payer device;

creating a first event invoice of a plurality of event invoices and associating a first identifier of the first mobile payer device with the first event invoice in response to receiving an indication from the first mobile payer device of a confirmation made through the graphical user interface;

associating a second identifier for a second mobile payer device with the first event invoice in response to receiving an indication of the second mobile payer device from the first mobile payer device made through the graphical user interface;

determining that the second mobile payer device has a charging event location in the event area;

determining a charge associated with the second mobile payer device, wherein the charge is incurred in response to the second mobile payer device entering the charging event location in the event area;

assigning the charge associated with the second mobile payer device to the first event invoice associated with the first identifier of the first mobile payer device; and causing a payment to be made for the first event invoice from a payer account associated with the first mobile payer device.

16. The non-transitory machine-readable medium of claim 15, wherein the wireless communication system includes a plurality of wireless networking devices that are positioned in the event area and configured to provide a wireless network in the event area.

17. The non-transitory machine-readable medium of claim 16, wherein the wireless network provided by the plurality of wireless networking devices is a wireless local area network (LAN) and the detecting the first mobile payer device entering the event area occurs in response to the first mobile payer device connecting to the wireless LAN.

18. The non-transitory machine-readable medium of claim 15, wherein the graphical user interface includes at least one pricing scheme and a confirmation element that is selectable to provide the indication from the first mobile payer device of the confirmation.

19. The non-transitory machine-readable medium of claim 15, wherein the operations further comprise:
causing, using the wireless communication system, the graphical user interface to further display on the second mobile payer device, wherein the determining a charge associated with the second mobile payer device is performed in response to receiving a payment confirmation through the graphical user interface from the second mobile payer device.

20. The non-transitory machine-readable medium of claim 15, wherein the
causing the payment to be made for the first event invoice from the payer account associated with the first mobile payer device is performed in response to detecting, using the wireless communication system, the first mobile payer device leaving the event area.

\* \* \* \* \*